(12) United States Patent
Manolakos et al.

(10) Patent No.: US 12,381,682 B2
(45) Date of Patent: Aug. 5, 2025

(54) SOUNDING REFERENCE SIGNAL CONFIGURATIONS FOR SUBBAND FULL DUPLEX OPERATION IN NEW RADIO

(71) Applicant: QUALCOMM Incorporated, San Diego, CA (US)

(72) Inventors: Alexandros Manolakos, Escondido, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 17/912,962

(22) PCT Filed: May 17, 2021

(86) PCT No.: PCT/US2021/032663
§ 371 (c)(1),
(2) Date: Sep. 20, 2022

(87) PCT Pub. No.: WO2021/247224
PCT Pub. Date: Dec. 9, 2021

(65) Prior Publication Data
US 2023/0114039 A1 Apr. 13, 2023

(30) Foreign Application Priority Data
Jun. 4, 2020 (GR) .............................. 20200100313

(51) Int. Cl.
*H04W 4/00* (2018.01)
*H04L 5/00* (2006.01)
*H04L 5/14* (2006.01)

(52) U.S. Cl.
CPC ............ *H04L 5/0051* (2013.01); *H04L 5/001* (2013.01); *H04L 5/14* (2013.01)

(58) Field of Classification Search
CPC .......... H04L 5/0051; H04L 5/001; H04L 5/14
See application file for complete search history.

(56) References Cited

U.S. PATENT DOCUMENTS 10,575,217 B2 * 2/2020 Manolakos ........... H04L 5/0051
11,818,077 B2 * 11/2023 Ding ....................... H04L 5/001
(Continued)

FOREIGN PATENT DOCUMENTS

WO 2019169588 A1 9/2019

OTHER PUBLICATIONS

International Search Report and Written Opinion—PCT/US2021/032663—ISA/EPO—Aug. 19, 2021.

*Primary Examiner* — Abdelnabi O Musa
(74) *Attorney, Agent, or Firm* — Sunstein LLP

(57) ABSTRACT

Techniques are provided for utilizing sounding reference signals (SRS) in full duplex scenarios. An example method for facilitating a measurement of a propagation channel in a wireless network includes receiving first sounding reference signal configuration information associated with a first frequency location in the component carrier, receiving second sounding reference signal configuration information associated with a second frequency location in the component carrier, wherein the second frequency location is disjoint from the first frequency location in the component carrier, and transmitting a first sounding reference signal and a second sounding reference signal based on the respective first sounding reference signal configuration information and the second sounding reference signal configuration information.

25 Claims, 19 Drawing Sheets

(56) References Cited

U.S. PATENT DOCUMENTS

| | | | |
|---|---|---|---|
| 2009/0059820 A1 | 3/2009 | Jung et al. | |
| 2010/0215114 A1* | 8/2010 | Kim | H04L 5/0048 |
| | | | 375/267 |
| 2010/0285762 A1* | 11/2010 | Ko | H04L 5/0048 |
| | | | 455/127.1 |
| 2017/0264465 A1* | 9/2017 | Lee | H04L 25/023 |
| 2017/0302419 A1* | 10/2017 | Liu | H04L 5/0078 |
| 2018/0234945 A1* | 8/2018 | Juretzek | H04W 72/30 |
| 2018/0323928 A1* | 11/2018 | Yang | H04L 5/0048 |
| 2019/0058562 A1* | 2/2019 | Yoo | H04L 5/0091 |
| 2020/0154319 A1 | 5/2020 | Manolakos et al. | |
| 2020/0404661 A1 | 12/2020 | Chen et al. | |
| 2021/0021392 A1* | 1/2021 | Hoshino | H04L 5/0048 |
| 2021/0185614 A1* | 6/2021 | Zhou | H04W 52/0225 |
| 2021/0377876 A1* | 12/2021 | Jeon | H04W 24/08 |
| 2022/0322393 A1* | 10/2022 | Lin | H04W 72/1268 |
| 2023/0030823 A1* | 2/2023 | Wang | H04L 5/0012 |
| 2023/0283430 A1* | 9/2023 | Zhu | H04B 7/0404 |
| | | | 370/329 |
| 2024/0107541 A1* | 3/2024 | Mahama | H04L 5/0051 |

* cited by examiner

SOUNDING REFERENCE SIGNAL CONFIGURATIONS FOR SUBBAND FULL DUPLEX OPERATION IN NEW RADIO

CROSS-REFERENCE TO RELATED APPLICATIONS

This application is the National Stage of International Application No. PCT/US2021/32663, filed May 17, 2021, entitled "SOUNDING REFERENCE SIGNAL CONFIGURATIONS FOR SUBBAND FULL DUPLEX OPERATION IN NEW RADIO," which claims the benefit of Greek patent application Ser. No. 20200100313, filed Jun. 4, 2020, entitled "SOUNDING REFERENCE SIGNAL CONFIGURATIONS FOR SUBBAND FULL DUPLEX OPERATION IN NEW RADIO," both of which are assigned to the assignee hereof, and the entire contents of which are hereby incorporated herein by reference for all purposes.

FIELD OF THE DISCLOSURE

Aspects of the present disclosure relate to wireless communications, and more particularly, to techniques for user equipment(s) to utilize sounding reference signals with full duplex operations.

DESCRIPTION OF RELATED ART

Wireless communication systems are widely deployed to provide various telecommunication services such as telephony, video, data, messaging, broadcasts, positioning, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Fifth Generation New Radio systems (5G NR), Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some wireless communication systems, a sounding reference signal (SRS) may be transmitted by a user equipment (UE) according to instructions provided by a communications network. (e.g., base station). A network base station may receive the SRS and measure the uplink propagation channel from the SRS. UE specific measurements may be used by the network to measure uplink propagation channels for each resource block within an active bandwidth part. The SRS may also be used to estimate the downlink propagation channel between a base station and the UE. Newer wireless communication systems such as 5G NR, base stations and UEs may be capable of full duplex operations. In full duplex operations, a slot may contain both uplink (UL) and downlink (DL) bands. Issues associated with self-interference and jamming from neighboring stations may degrade SRS measurements.

SUMMARY

An example method for facilitating a measurement of a propagation channel in a wireless network according to the disclosure includes receiving first sounding reference signal configuration information associated with a first frequency location in a component carrier, receiving second sounding reference signal configuration information associated with a second frequency location in the component carrier, wherein the second frequency location is disjoint from the first frequency location in the component carrier, and transmitting a first sounding reference signal and a second sounding reference signal based on the respective first sounding reference signal configuration information and the second sounding reference signal configuration information.

Implementations of such a method may include one or more of the following features. Bandwidth part information may be received, such that the first frequency location and the second frequency location are within an active bandwidth part. Resource bandwidth information may be received, such that the first frequency location is associated with a first resource bandwidth within the active bandwidth part, and the second frequency location is associated with a second resource bandwidth within the active bandwidth part. The first resource bandwidth may be associated with a first priority value and the second resource bandwidth is associated with a second priority value. The user equipment may be configured to prioritize transmit power based on the first priority value and the second priority value. The first frequency location may be associated with a first bandwidth part and the second frequency location is associated with a second bandwidth part. The first sounding reference signal and the second sounding reference signal may be transmitted simultaneously. The first sounding reference signal and the second sounding reference signal may have the same usage. A transmit power for the first sounding reference signal and a transmit power for the second sounding reference signal are equally decreased to meet a transmit power budget for the user equipment. The method may include determining a capability of the user equipment, and transmitting the first sounding reference signal and the second sounding reference signal based at least in part on the capability of the user equipment. The first sounding reference signal and the second sounding reference signal may be a same type of sounding reference signal, and the user equipment may be configured to frequency division multiplex the first sounding reference signal and the second sounding reference signal. The first sounding reference signal and the second sounding reference signal may be different types of sounding reference signal with a same time-domain behavior, and the user equipment is configured to frequency division multiplex the first sounding reference signal and the second sounding reference signal. The user equipment may be configured to transmit the first sounding reference signal and the second sounding reference signal one at a time.

An example, method for facilitating a measurement of a propagation channel in a wireless network according to the disclosure include providing a user equipment with a first sounding reference signal information associated with a first frequency location in a component carrier and a second sounding reference signal information associated with a second frequency location in the component carrier, wherein the second frequency location is disjoint from the first frequency location in the component carrier, and receiving a first sounding reference signal and a second sounding reference signal from the user equipment.

Implementations of such a method may include one or more of the following features. Bandwidth part information may be provided to the user equipment, such that the first frequency location and the second frequency location are within an active bandwidth part. Resource bandwidth information may be provided to the user equipment, such that the first frequency location is associated with a first resource bandwidth within the active bandwidth part, and the second frequency location is associated with a second resource bandwidth within the active bandwidth part. The first resource bandwidth may be associated with a first priority value and the second resource bandwidth is associated with a second priority value. The first frequency location may be associated with a first bandwidth part and the second frequency location may be associated with a second bandwidth part. The first sounding reference signal and the second sounding reference signal may be received simultaneously. The first sounding reference signal and the second sounding reference signal may have the same usage. The first sounding reference signal information and the second sounding reference signal information may be provided to the user equipment via radio resource control signaling. The first sounding reference signal information and the second sounding reference signal information may be provided to the user equipment via one or more system information blocks. The method may include providing a trigger signal configured to cause the user equipment to transmit at least one of the first sounding reference signal or the second sounding reference signal. The trigger signal may be within a Medium Access Control Control Element (MAC CE) signal. The trigger signal may be within a Downlink Control Information (DCI) signal.

An example apparatus configured to operate in a subband full duplex mode including transmitting and receiving on the same Orthogonal Frequency-Division Multiplexing (OFDM) symbols on different subbands of a component carrier according to the disclosure includes a memory, at least one transceiver, at least one processor communicatively coupled to the memory and the at least one transceiver and configured to receive first sounding reference signal configuration information associated with a first frequency location in the component carrier, receive second sounding reference signal configuration information associated with a second frequency location in the component carrier, wherein the second frequency location is disjoint from the first frequency location in the component carrier, and transmit a first sounding reference signal and a second sounding reference signal based on the respective first sounding reference signal configuration information and the second sounding reference signal configuration information.

Implementations of such an apparatus may include one or more of the following features. The at least one processor may be further configured to receive bandwidth part information, such that the first frequency location and the second frequency location are within an active bandwidth part, and to receive resource bandwidth information, such that the first frequency location is associated with a first resource bandwidth within the active bandwidth part, and the second frequency location is associated with a second resource bandwidth within the active bandwidth part. The first resource bandwidth may be associated with a first priority value and the second resource bandwidth is associated with a second priority value. The at least one processor may be further configured to prioritize transmit power based on the first priority value and the second priority value. The first frequency location may be associated with a first bandwidth part and the second frequency location is associated with a second bandwidth part. The first sounding reference signal and the second sounding reference signal may be transmitted simultaneously. The first sounding reference signal and the second sounding reference signal may have the same usage. A transmit power for the first sounding reference signal and a transmit power for the second sounding reference signal may be equally decreased to meet a transmit power budget for the user equipment. The at least one processor may be further configured to determine a capability of a user equipment, and transmit the first sounding reference signal and the second sounding reference signal based at least in part on the capability of the user equipment. The first sounding reference signal and the second sounding reference signal may be a same type of sounding reference signal, and the user equipment is configured to frequency division multiplex the first sounding reference signal and the second sounding reference signal. The first sounding reference signal and the second sounding reference signal may be different types of sounding reference signal with a same time-domain behavior, and the user equipment is configured to frequency division multiplex the first sounding reference signal and the second sounding reference signal. The user equipment may be configured to transmit the first sounding reference signal and the second sounding reference signal one at a time.

An example apparatus for facilitating a measurement of a propagation channel in a wireless network according to the disclosure includes a memory, at least one transceiver, at least one processor communicatively coupled to the memory and the at least one transceiver and configured to provide a user equipment with a first sounding reference signal information associated with a first frequency location in a component carrier and a second sounding reference signal information associated with a second frequency location in the component carrier, wherein the second frequency location is disjoint from the first frequency location in the component carrier, and receive a first sounding reference signal and a second sounding reference signal from the user equipment.

Implementations of such an apparatus may include one or more of the following features. The at least one processor may be further configured to provide bandwidth part information to the user equipment, such that the first frequency location and the second frequency location are within an active bandwidth part, and to provide resource bandwidth information to the user equipment, such that the first frequency location is associated with a first resource bandwidth within the active bandwidth part, and the second frequency location is associated with a second resource bandwidth within the active bandwidth part. The first resource bandwidth may be associated with a first priority value and the second resource bandwidth is associated with a second priority value. The first frequency location may be associated with a first bandwidth part and the second frequency location is associated with a second bandwidth part. The first sounding reference signal and the second sounding reference signal may be received simultaneously. The first sounding reference signal and the second sounding reference signal may have the same usage. The first sounding reference signal information and the second sounding reference signal information may be provided to the user equipment via radio resource control signaling. The first sounding reference signal information and the second sounding reference signal information may be provided to the user equipment via one or more system information blocks. The at least one processor may be further configured to provide a trigger signal configured to cause the user equipment to transmit at least one of the first sounding reference signal or the second sounding reference signal. The trigger signal may be within a Medium Access Control Control Element (MAC CE) signal. The trigger signal may be within a Downlink Control Information (DCI) signal.

An example apparatus for facilitating a measurement of a propagation channel in a wireless network according to the disclosure includes means for receiving first sounding reference signal configuration information associated with a first frequency location in the component carrier, means for receiving second sounding reference signal configuration information associated with a second frequency location in a component carrier, wherein the second frequency location is disjoint from the first frequency location in the component carrier, and means for transmitting a first sounding reference signal and a second sounding reference signal based on the respective first sounding reference signal configuration information and the second sounding reference signal configuration information.

An example apparatus for facilitating a measurement of a propagation channel in a wireless network according to the disclosure includes means for providing a user equipment with a first sounding reference signal information associated with a first frequency location in a component carrier and a second sounding reference signal information associated with a second frequency location in the component carrier, wherein the second frequency location is disjoint from the first frequency location in the component carrier, and means for receiving a first sounding reference signal and a second sounding reference signal from the user equipment.

An example non-transitory processor-readable storage medium comprising processor-readable instructions configured to cause one or more processors to facilitate a measurement of a propagation channel in a wireless network according to the disclosure includes code for receiving first sounding reference signal configuration information associated with a first frequency location in a component carrier, code for receiving second sounding reference signal configuration information associated with a second frequency location in the component carrier, wherein the second frequency location is disjoint from the first frequency location in the component carrier, and code for transmitting a first sounding reference signal and a second sounding reference signal based on the respective first sounding reference signal configuration information and the second sounding reference signal configuration information.

An example non-transitory processor-readable storage medium comprising processor-readable instructions configured to cause one or more processors to facilitate a measurement of a propagation channel in a wireless network according to the disclosure includes code for providing a user equipment with a first sounding reference signal information associated with a first frequency location in a component carrier and a second sounding reference signal information associated with a second frequency location in the component carrier, wherein the second frequency location is disjoint from the first frequency location in the component carrier, and code for receiving a first sounding reference signal and a second sounding reference signal from the user equipment.

Items and/or techniques described herein may provide one or more of the following capabilities, as well as other capabilities not mentioned. Base stations and user equipment may be configured for full duplex operations. A communication network may be based on full duplex schemes including frames with half duplex and full duplex slots. A base station may provide user equipment with parameters defining sounding reference signal (SRS) resources for subband full duplex operations. The parameters may define a first SRS resource in a first frequency location and a second SRS resource in a second frequency location. The first and second frequency locations may be disjoint locations in a component carrier. The first and second frequency locations may be within one or more bandwidth parts. The SRS resources may be associated with resource bandwidths (i.e., subbands) within a bandwidth part. The first and second SRS may be transmitted simultaneously. SRS resources may be associated with priority values. SRS measurements may be improved in full duplex operations. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1:
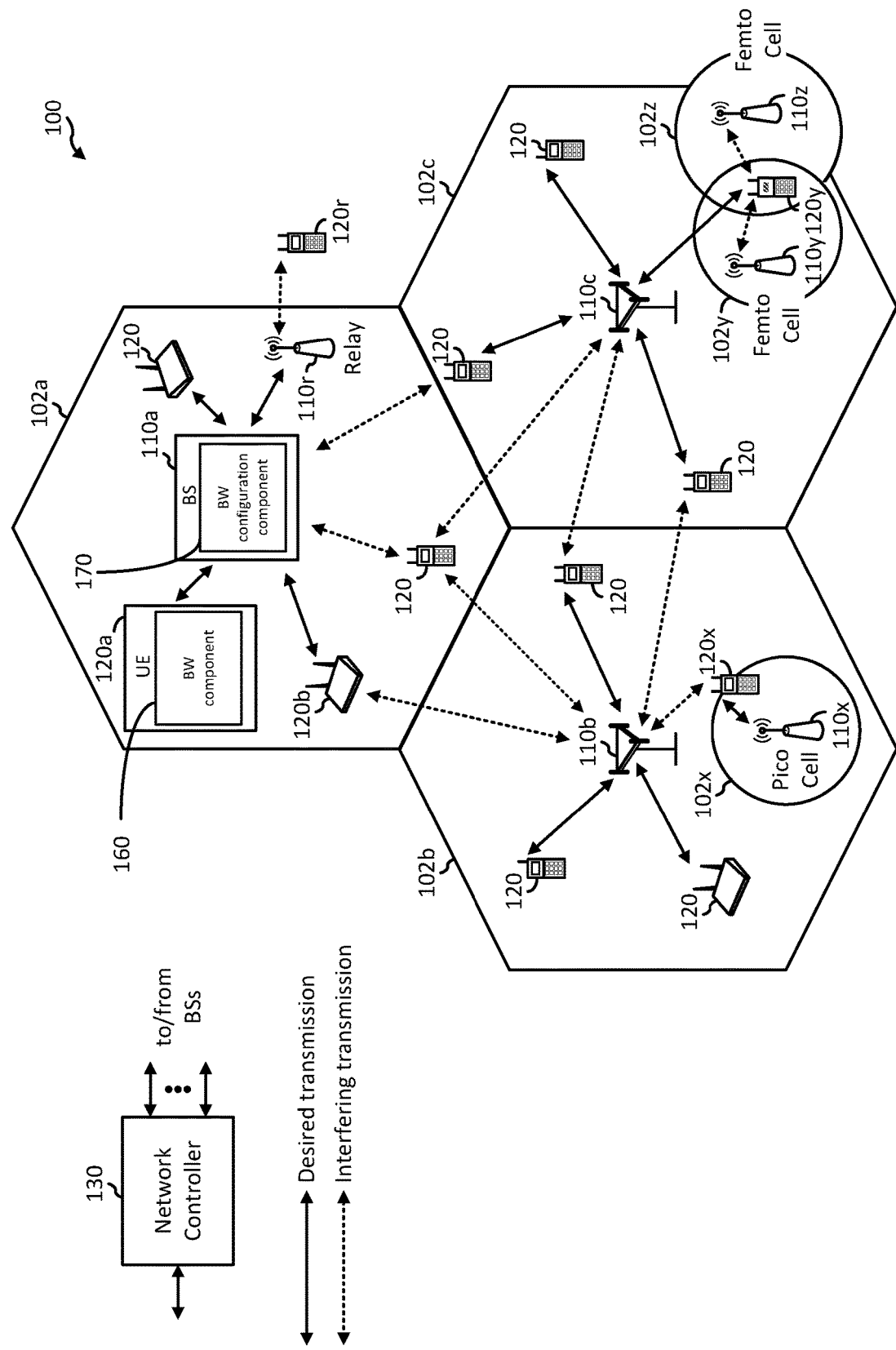
FIG. 1 is a block diagram conceptually illustrating an example telecommunications system.

Techniques are discussed herein for utilizing sounding reference signals (SRS) in full duplex scenarios. A 5G NR deployment may include frames with slots configured for full duplex mode operations. In a full duplex communication mode, antenna systems may have some elements configured to transmit while other elements are configured to receive. The signal to noise ratio of a station or mobile device operating in full duplex mode may be degraded due to self-interference (e.g., transmitter leakage). SRS transmissions may occur during a slot configured for full duplex operations. For example, a component carrier (CC) may be subdivided into different bandwidth parts (BWPs). In subband full duplex operations, slots in the component carrier may be split in frequency between uplink (UL) and downlink (DL) BWPs. In some scenarios, a slot maybe UL dominated such that a disjointed UL band is allocated at both edges of the component carrier bandwidth and a DL band is located between the UL band on the edges. Legacy user equipment and stations may not be capable of full duplex operations and/or may be incapable of rapidly tuning internal radio frequency (RF) components based on the locations of the BWPs. The techniques provided herein enable the transmission of SRS in disjoint bandwidth portions of a common carrier. For example, SRS may be defined relative to a single bandwidth part. SRS may be defined within multiple and simultaneously active bandwidth parts. A bandwidth part may include a plurality of resource bandwidths (RBWs) and one or more SRS may be defined within a RBW. The configuration of SRS in BWPs and RBWs may be based on the capabilities of the UE (e.g., bandwidth, retuning times). Constraints on the transmission of SRS in disjointed UL bands may be applied to prioritize resources based on UE and network capabilities. These techniques are examples, and not exhaustive.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Fifth Generation New Radio (5G NR). 5G NR is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for 5G NR wireless networks and radio technologies, as well as other wireless networks and radio technologies.

Referring to FIG. 1, an example wireless communication network 100 is shown. The wireless communication network 100 may be a full-duplex NR system (e.g., a full-duplex 5G network). In an example, a mobile device such as a User Equipment (UE) 120a has a bandwidth (BW) component 160 that may be configured for adapting an operating BW of the UE 120a. Similarly, a base station (BS) 110a may include a BW configuration component 170 that may configure a UE, such as UE 120a, to adapt an operating BW.

The wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. The BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. A relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120a, 120b, 120x, 120y, etc.) may be dispersed throughout the wireless communication network 100, and each UE may be stationary or mobile. A UE may also be referred to as a mobile device, a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. NR may support transmitting sounding reference signals (SRS) in one or more slots as described herein.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum). In an example, a the sidelink signals may be configured for full duplex or half duplex operations. A position frequency layer may be used to facilitate full duplex and/or half duplex UE-to-UE transmissions for sidelink positioning applications.

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
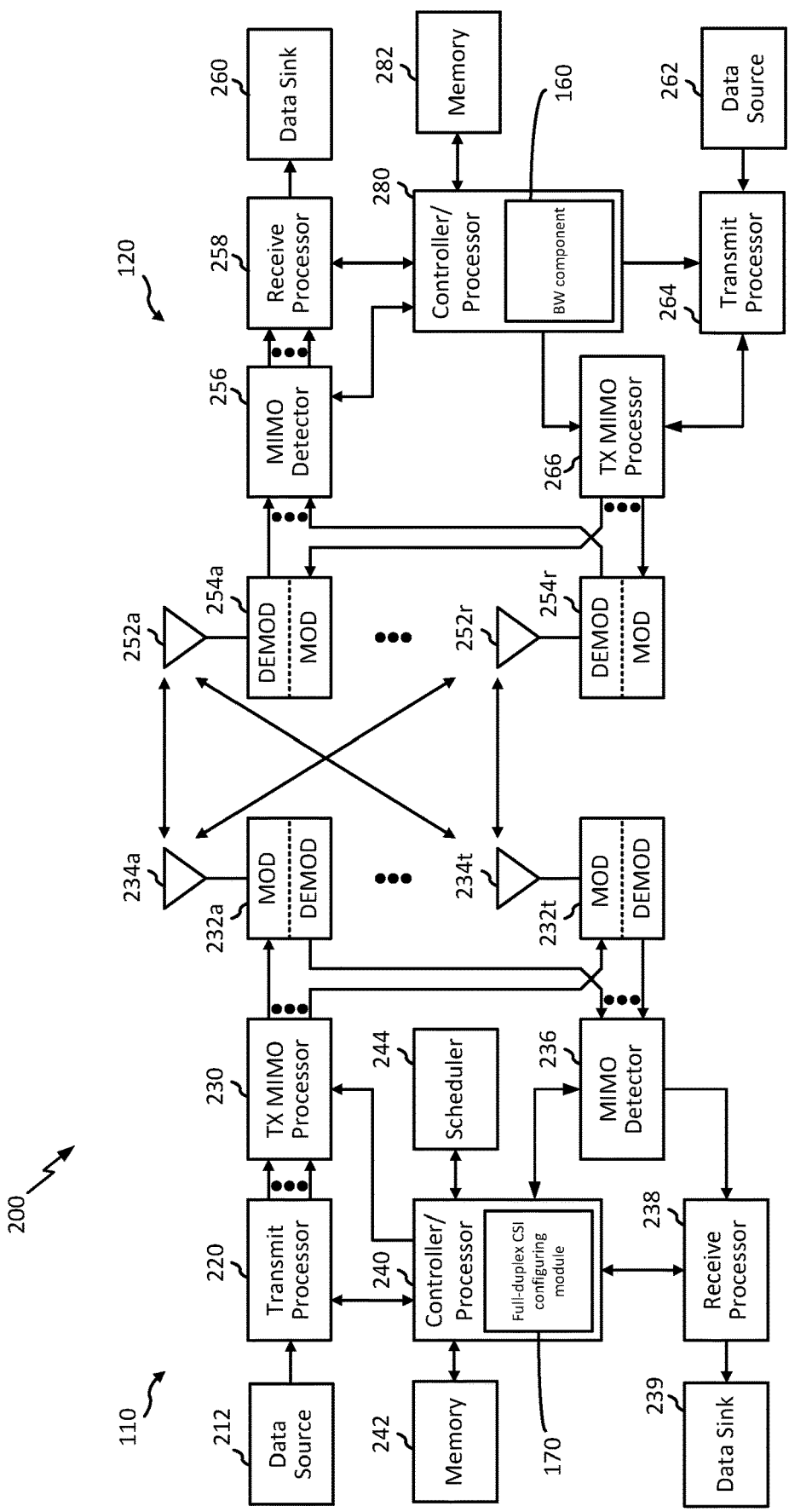
FIG. 2 is a block diagram illustrating an example architecture of a distributed radio access network (RAN), in accordance with certain aspects of the present disclosure.

Referring to FIG. 2, example components of BS 110 and UE 120 (e.g., in the wireless communication network 100 of FIG. 1) are shown. The components include antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

At the BS 110, a transmit processor 220 may receive data from a data source 212 and control information from a controller/processor 240. For LTE systems, the control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), cell-specific reference signal (CRS), and positioning reference signal (PRS). For NR systems, the control information may include logical and transport channels including a broadcast control channel (BCCH), a paging control channel (PCCH), a common control channel (CCCH), a dedicated control channel (DCCH), a dedicated traffic channel (DTCH), a broadcast channel (BCH), a paging channel (PCH) and a downlink shared channel (DL-SCH). The physical channels in a 5G NR system may include a PBCH, PDCCH, and a PDSCH. The physical signals may include demodulate reference signals (DM-RS), phase tracking reference signal (PT-RS), a channel state information reference signal (CSI-RS), primary and secondary synchronization signals (PSS/SSS) and downlink PRS (DL PRS).

A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

5G NR wireless networks are expected to provide ultra-high data rates and support a wide scope of application scenarios. Wireless full duplex (FD) communications is an emerging technique and is theoretically capable of doubling the link capacity when compared with half duplex (HD) communications. The main idea of wireless full duplex communications is to enable radio network nodes to transmit and receive simultaneously on the same frequency band in the same time slot. This contrasts with conventional half duplex operation, where transmission and reception either differ in time or in frequency. The wireless communication network 100 may support various FD communication modes.

Figure 3A:
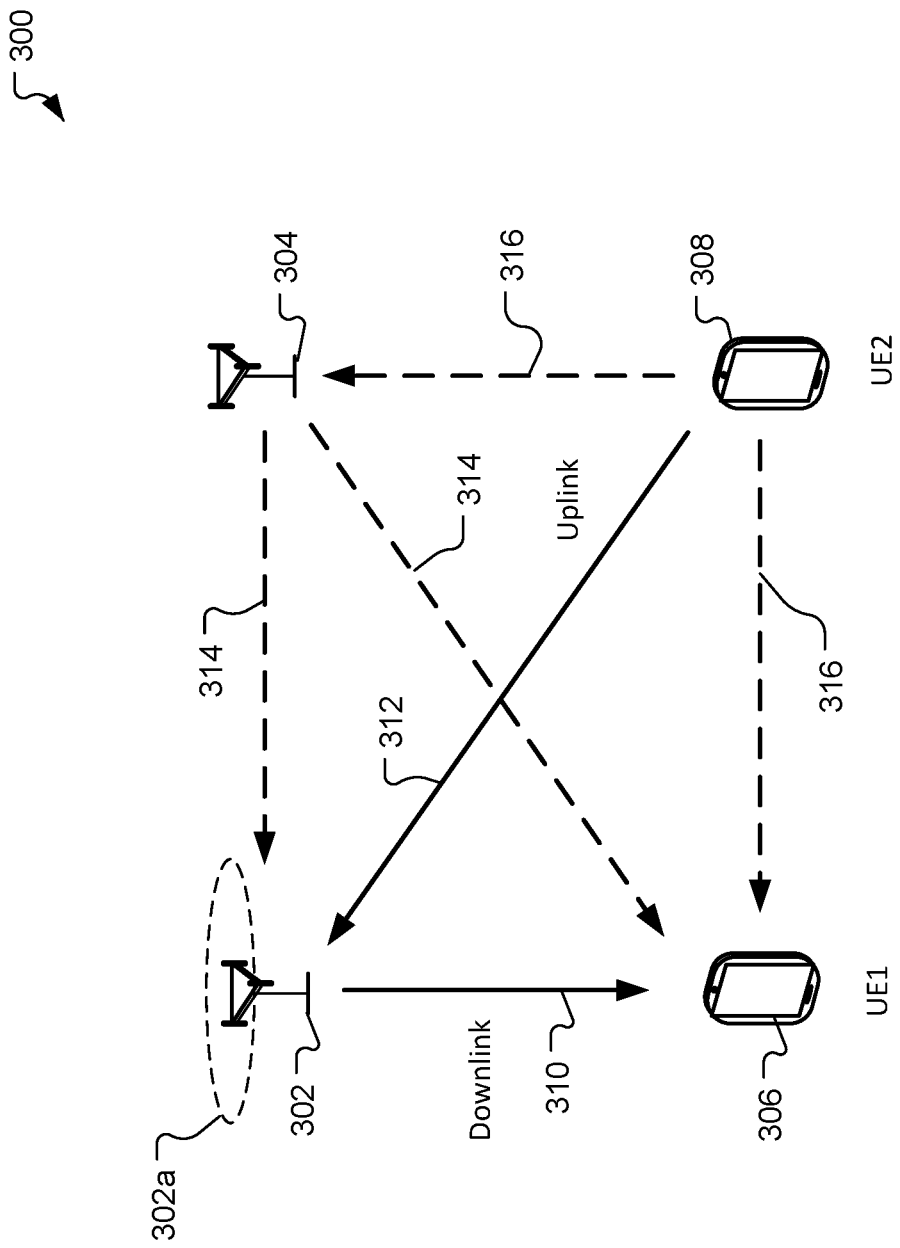
FIGS. 3A-3C illustrate different full duplex communication modes in a telecommunication system.

Referring to FIG. 3A, with further reference to FIGS. 1 and 2, an illustration 300 of full duplex communication mode with a full duplex base station and a half duplex UE is shown. The illustration includes the FD BS 302, a HD BS 304, a first HD UE 306, and a second HD UE 308. The FD BS 302 can communicate simultaneously in UL and DL with the two HD UEs 306, 308 using the same radio resources. For example, the FD BS 302 may communicate with the first HD UE 306 via the downlink 310 and with the second HD UE 308 with the uplink 312. The FD BS 302 may be susceptible to self-interference 302a from its downlink to uplink operation, as well as interference 312 from other gNBs such as the HD BS 304. The first HD UE 306 may be susceptible to interference 314 from the HD BS 304 and interference 316 from the second HD UE 308. In general, the self-interference 302a (or transmitter leakage) refers to the signal that leaks from the device transmitter to its own receiver.

Figure 3B:
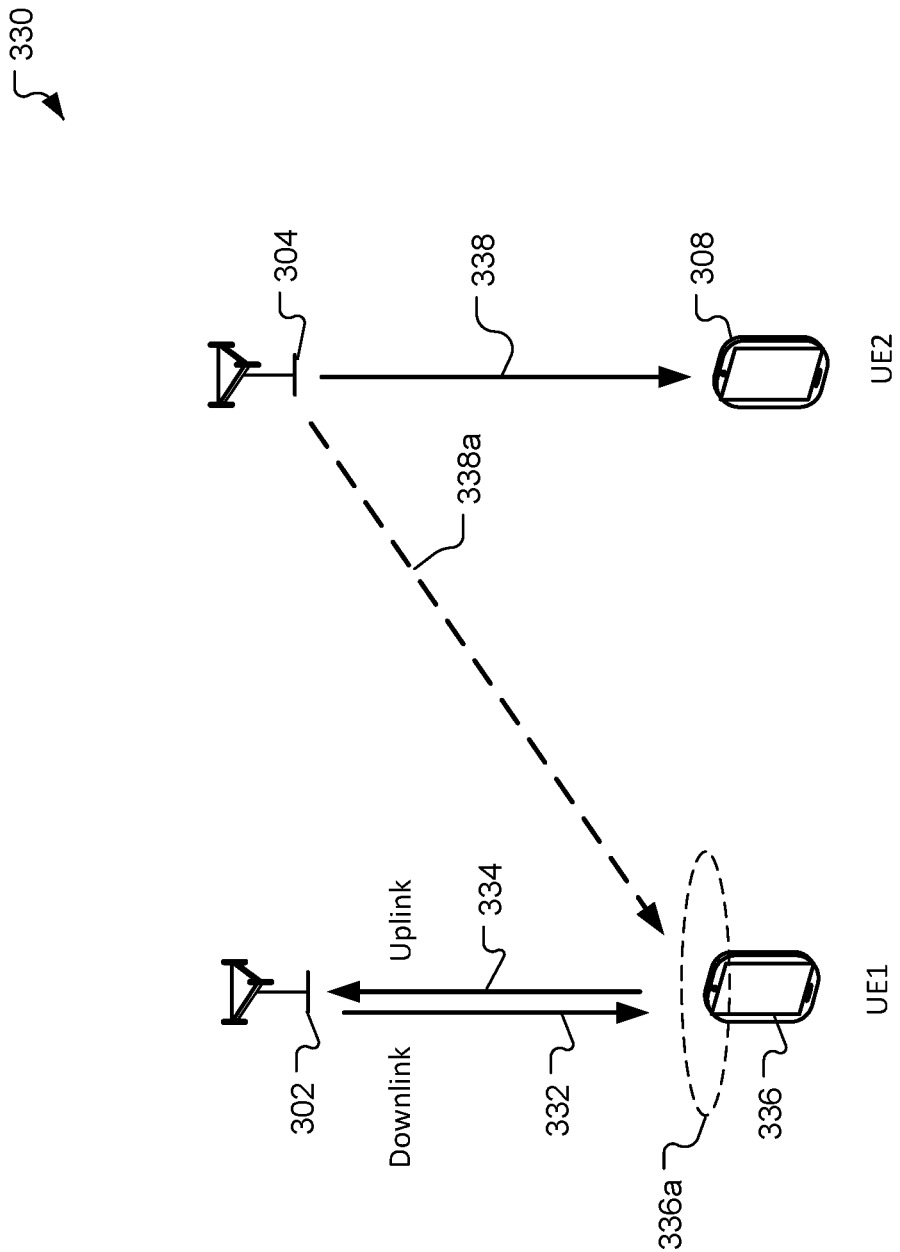

Referring to FIG. 3B, an illustration 330 of another full duplex communication mode with a full duplex base station and a full duplex UE is shown. The illustration 330 includes the FD BS 302, the HD BS 304, a FD UE 336, and the HD UE 308. The FD BS 302 and the FD UE 336 are configured to communicate simultaneously via an UL 334 and a DL 332 using the same radio resources. The HD BS 304 is communicating with the HD UE 308 via a DL 338. While communicating, the FD UE 336 may be susceptible to self-interference 336a, and interference 338a from other gNB(s) such as the HD BS 304. The FD UE 336 may also be susceptible to interference transmitting from the HD UE 308.

Figure 3C:
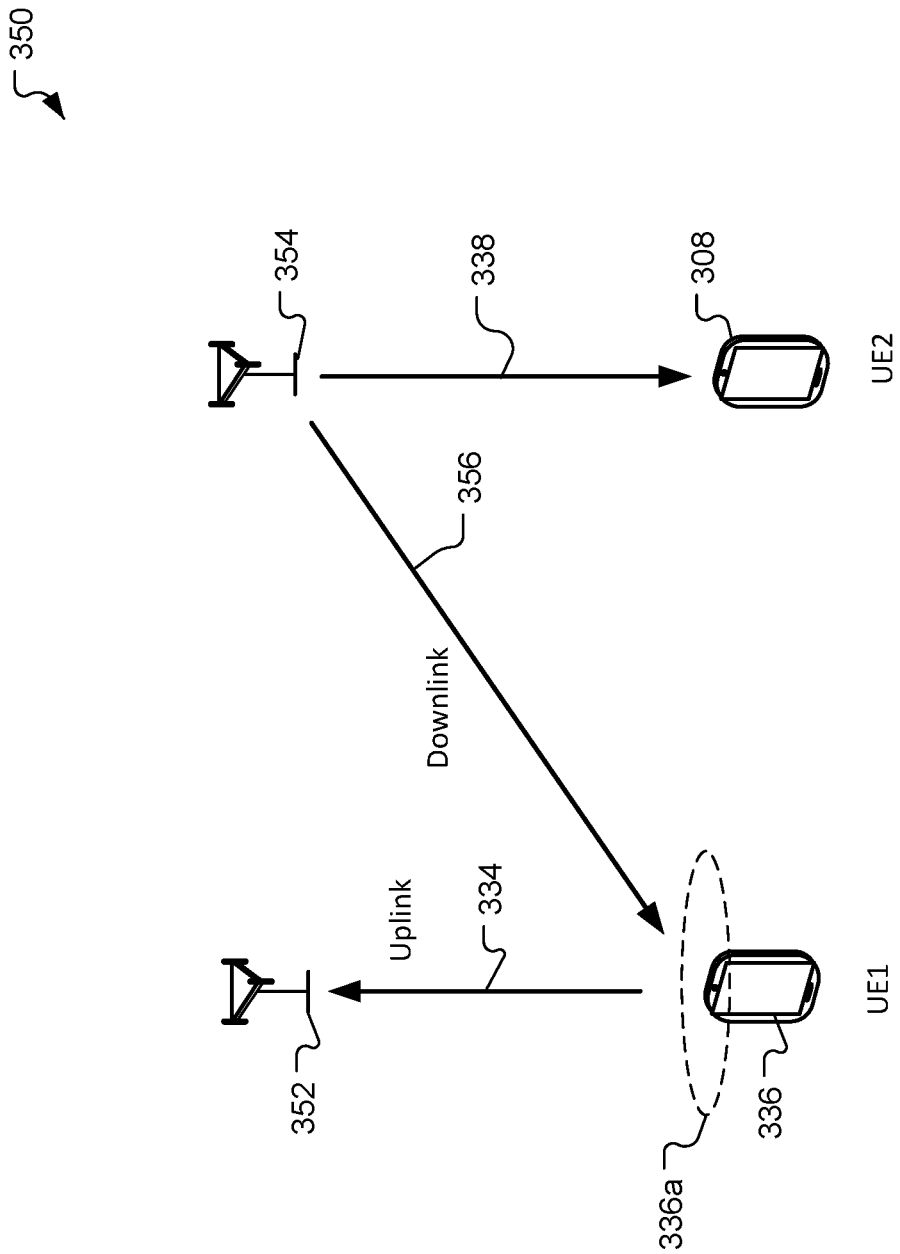

Referring to FIG. 3C, an illustration 350 of another full duplex communication mode with a full duplex UE. The illustration 350 includes a first HD BS 352, a second HD BS 354, the FD UE 336 and the HD UE 308. The FD UE 336 is configured to communicate simultaneously in UL and DL with multiple transmission-reception points (e.g., multiple BSs) using the same radio resources. For example, the FD UE 336 may simultaneously communicate with the first HD BS 352 via the UL 334, and with the second HD BS 354 via the DL 356. The FD UE 336 may be susceptible to self-interference 336a from UL to DL operation. In an example, both UE1 336 and UE2 308 may be configured as FD UEs and capable of full duplex communications via device-to-device (D2D) sidelinks (e.g., PC5).

Figure 4A:
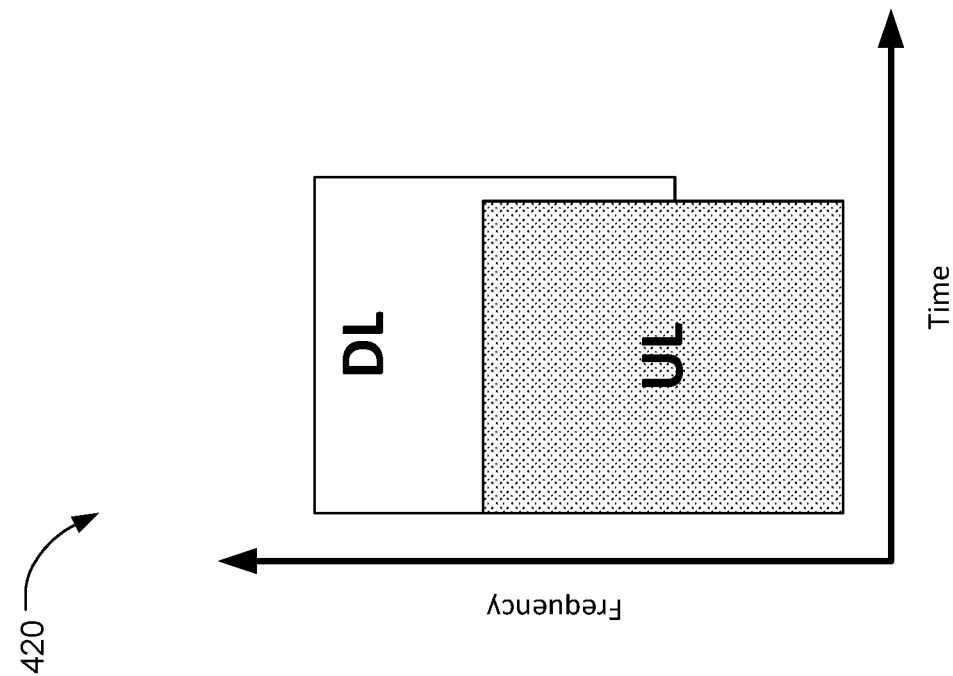
FIGS. 4A & 4B show examples of different types of full duplex operation.
Figure 4A:
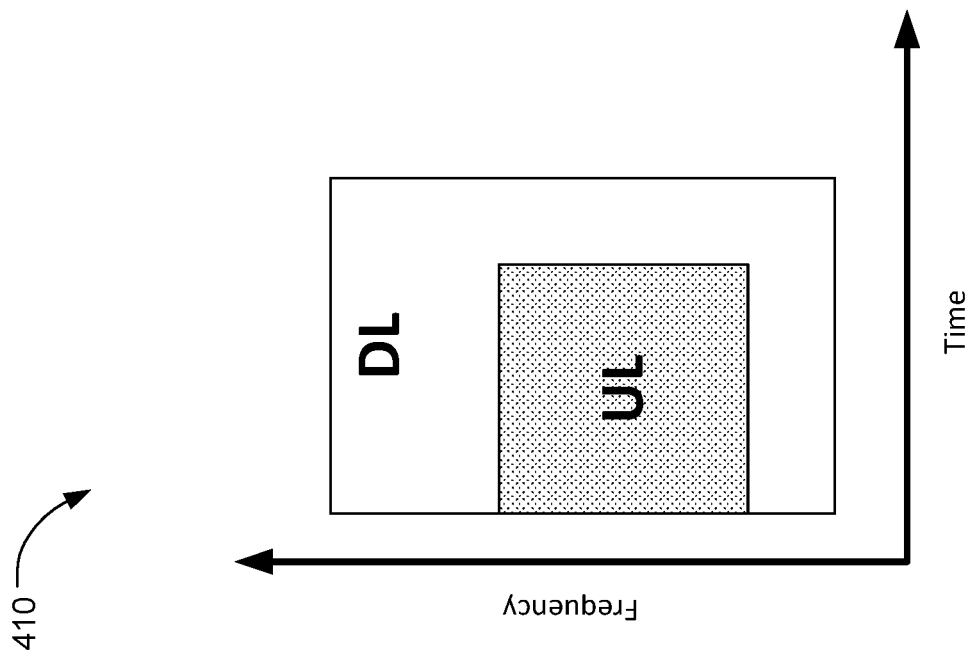

In addition to supporting various FD communication modes (also referred to herein as deployments), the wireless communication system may support various types of FD operation. In-band full duplex (IBFD), for example, is one type of FD operation in which devices can transmit and receive at the same time and on the same frequency resources. As shown in 410 of FIG. 4A, in one aspect, the DL and UL may fully share the same IBFD time/frequency resource (e.g., there may be a full overlap of the DL and UL allocations within the IBFD time/frequency resource). As shown in 420 of FIG. 4A, in one aspect, the DL and UL may partially share the same IBFD time/frequency resource (e.g., there may be a partial overlap of the DL and UL allocations within the IBFD time/frequency resource).

Figure 4B:
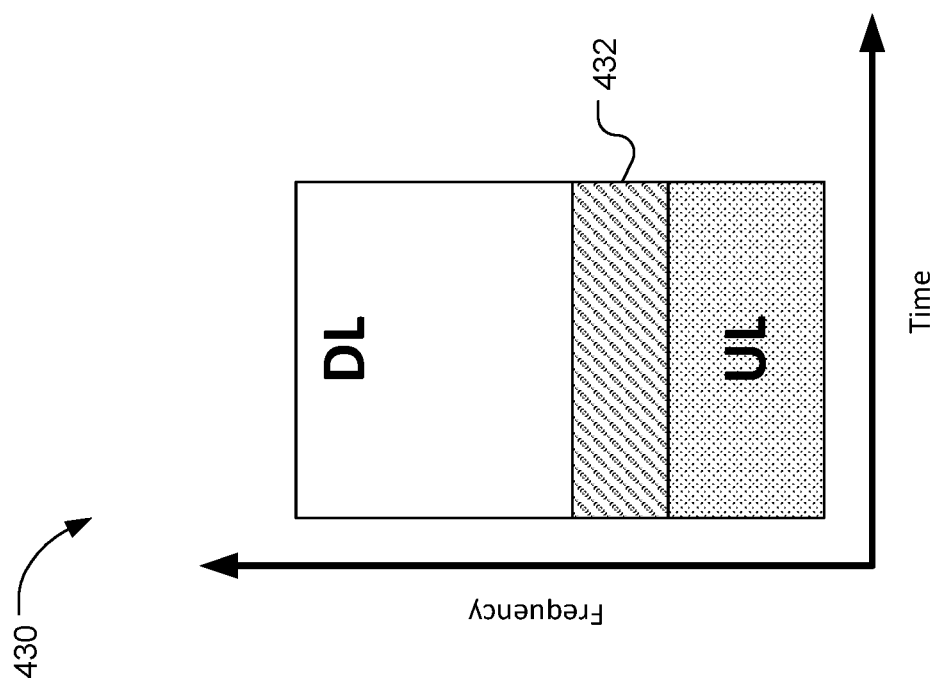

Subband FDD (also referred to as flexible duplex) is another type of FD operation in which devices can transmit and receive at the same time but on different frequency resources. Referring to the diagram 430 in FIG. 4B, the DL resource may be separated from the UL resource in the frequency domain by a guard band 432. This mode of operations reduces the self-interference cancellation requirements on the FD device since the leakage is lower.

Figure 5:
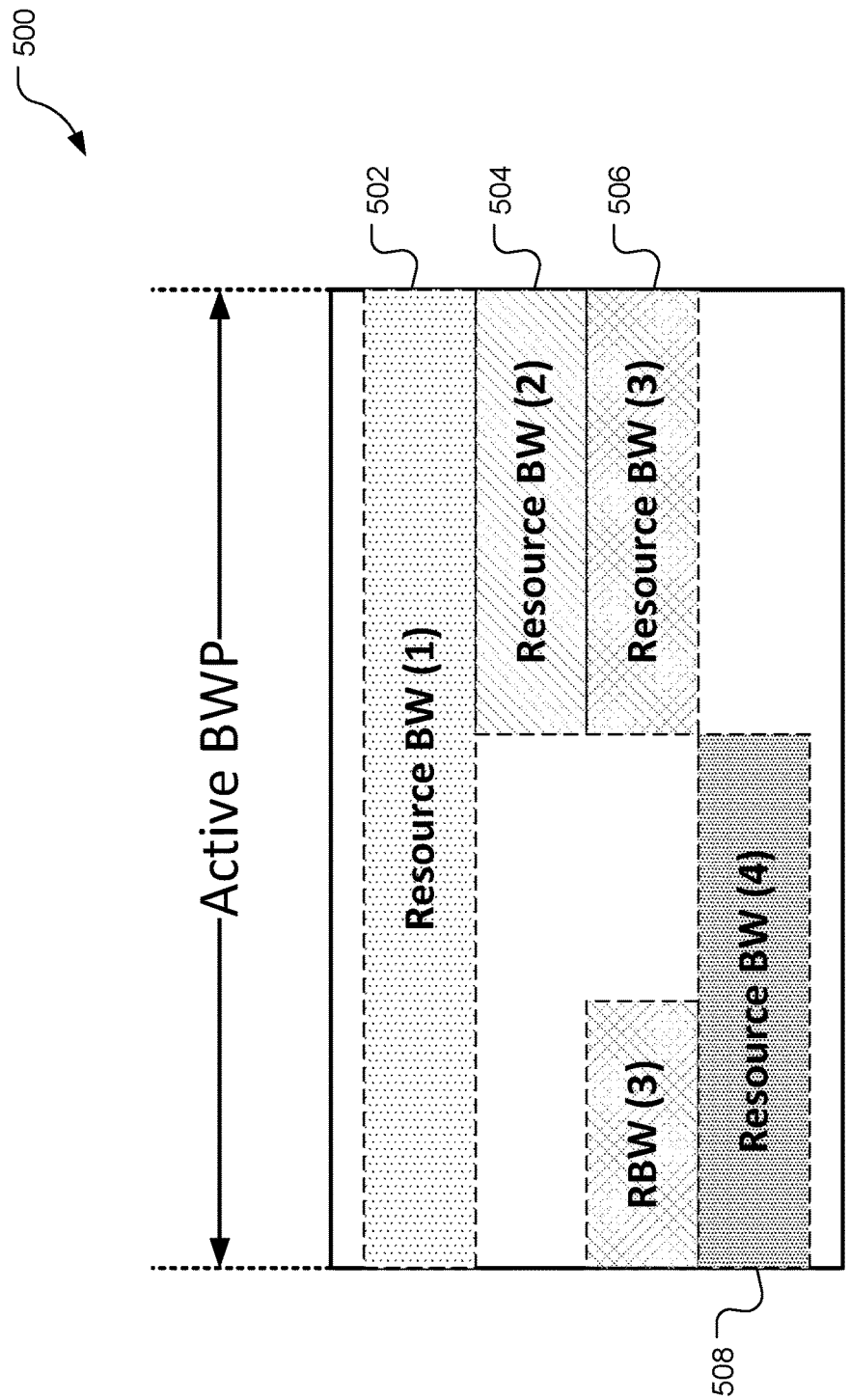
FIG. 5 illustrates example resource bandwidths within an active bandwidth part.

Referring to FIG. 5, an example bandwidth part 500 with a plurality of resource bandwidths is shown. In general, the bandwidth part (BWP) 500 represents a set of contiguous common resource blocks in the component carrier. In this illustration, frequency of the BWP 500 is shown along the horizontal axis of FIG. 5. A BWP may be used to provide services to a UE which does not support the full channel bandwidth (i.e., when the channel bandwidths of a base station and a UE do not match). In an example, a UE may be configured with up to 4 DL BWPs per carrier and up to 4 UL BWPs per carrier. The UE may utilize DL and UL BWPs to transmit and receive signals such as a data channel, control channel CSI-RS, PUCCH, PUSCH, etc. As discussed herein, UL BWPs may also be used for transmitting SRS. The bandwidth part information, including one or more BWPs and associated resource BWs (RBWs) may be signaled by one or more System Information Block (SIBs) received from a base station. A UE may be configured with a default DL BWP and/or receive a parameter structure to configure an initial DL BWP (e.g., using the initialDownlinkBWP parameter structure defined in 3GPP TS 38.211). The parameters for UL BWPs may be received in the bandwidth part information (e.g., via SIBs or other dedicated signaling). A base station may dynamically switch the activated BWP (e.g., the Active BWP) via a Bandwidth Part Indicator field with a Downlink Control Information (DCI) signal. This switching procedure, however, is not instantaneous and a base station may not allocate resources immediately after changing the Active BWP. The switching delay times are defined in industry technical specification such as 3GPP TS 38.133. The impact of the switching delay times may be mitigated with the use of resource BW blocks (RBWs).

The bandwidth part information defining the active BWP (i.e., the bandwidth part 500 that is currently active) may further include resource bandwidth information defining a plurality of resource BWs, such as a first resource BW 502, a second resource BW 504, a third resource BW 506, and a fourth resource BW 508. The terms resource BW, RBW, and subband may be used interchangeably herein. In contrast to the delay associated with switching an active BWP, a base station may utilize DCI-based or Medium Access Control Control Elements (MAC-CE) signaling to quickly change between the resource BWs 502, 504, 506, 508. Radio Resource Control (RRC) signaling may be used to configure the resource BWs 502, 504, 506, 508 with in the BWP 500. The BWP 500 is associated with radio parameters required for communication with the base station (e.g., PUCCH, PUSCH, SRS, PDSCH, PDCCH, DMRS, etc.) and when the Active BWP is switched, the UE may have to reconfigure internal radio parameters based on the new BWP. Each of the resource BWs 502, 504, 506, 508 inherits the signaling configuration from the Active BWP and may eliminate the need to retune RF components in some UEs. The resource BWs may cover all or some of the Active BWP. For example, the first resource BW 502 covers a significant portion of the Active BWP, and the second, third and fourth resource BW 504, 506, 508 cover smaller portions of the Active BWP. A resource BW may have disjointed coverage over the Active BWP. For example, the third resource BW 506 include areas on both edges of the Active BWP. The resource BWs may be included in UL and DL BWPs and may be partially overlapping (e.g., in IBFD) or non-overlapping (e.g., SBFD).

Figure 6:
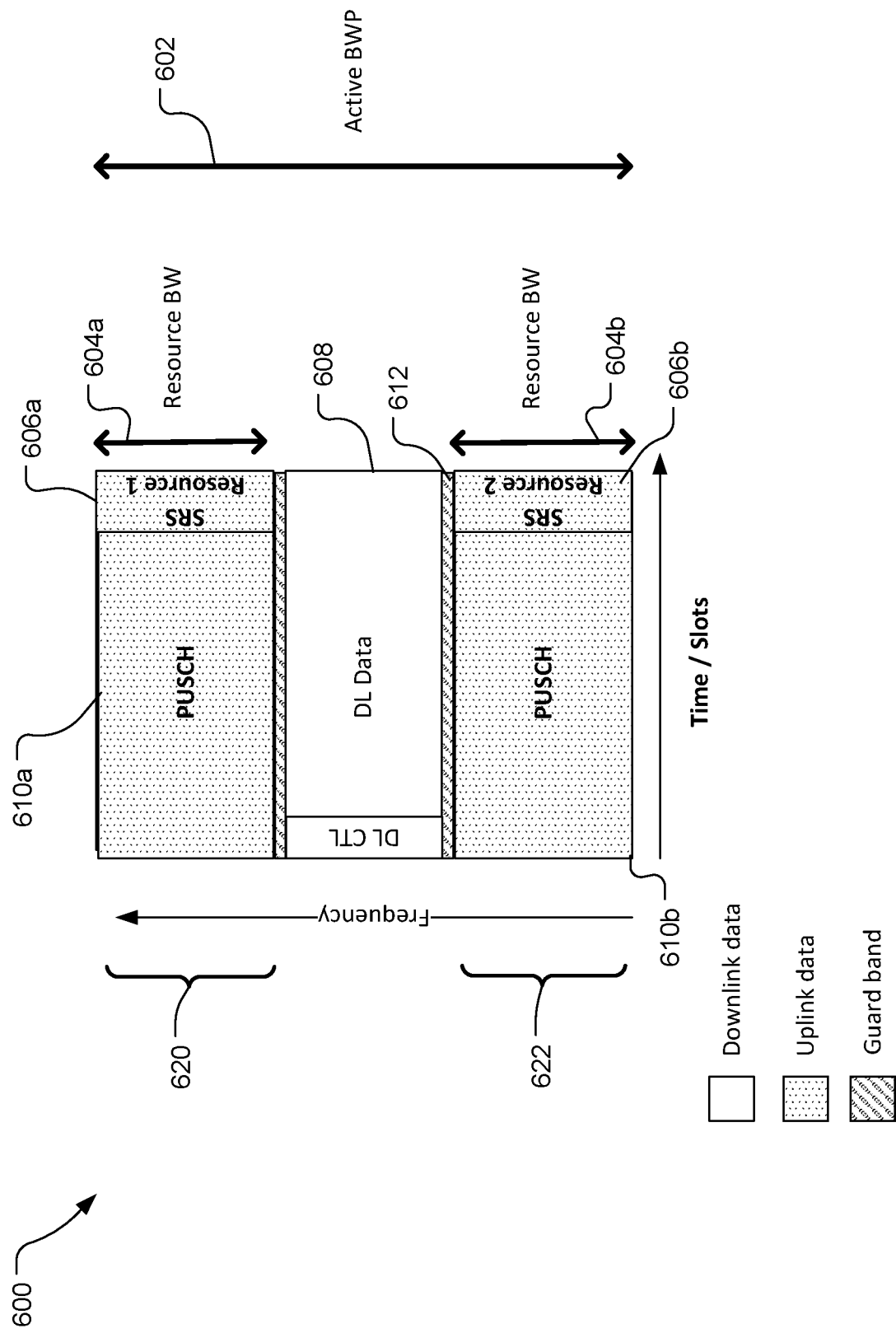
FIG. 6 illustrates an example subband full duplex spectrum within an active bandwidth part.

Referring to FIG. 6, an example subband full duplex spectrum 600 within an active bandwidth part is shown. An active BWP 602 is configured for subband full duplex operation with DL and UL segments within the bandwidth. For example, a DL segment 608 may include slots configured for downlink control (DL CTL) and downlink data (DL Data). The active BWP 602 may include a guard band region 612 between the DL segment 608 and UL segments 610a-b. The UL segments 610a-b may be defined within resource BWs 604a and may be configured for PUSCH and SRS transmissions. For example, a first resource BW 604a may include parameters associated with a first SRS Resource 606a, and a second resource BW 604a may include parameters associated with a second SRS Resource 606b. The first resource BW 604a and the first SRS resource 606a are in a first frequency location 620 in the component carrier, and the second resource BW 604b and the second SRS resource 606b are in a second frequency location 622 of the component carrier. In subband full duplex, the first frequency location 620 does not overlap with the second frequency location 622 (e.g., the first frequency location 620 is disjoint from the second frequency location 622 in the component carrier). The configuration of the UL and DL segments 608, 610a-b, the resource BWs 604a-b, the SRS resources 606a-b, and the first and second frequency locations 620, 622 are examples and not limitations. Other configurations may be used. In general, a SRS resource, or SRS resource set, may be configured within a resource BW, which may be configured within a BWP of a common carrier. Within each BWP, there can be up to 'X' Resource BWs, and each Resource BW can have up to 'N' SRS configurations. The values of 'X' and 'N' may vary based on the capabilities of a communication network. Some restrictions may be required when configuring SRS resources in slots of the Active BWP 602. That is, there may be network standards relating to multiplexing of SRS with other UL channels (e.g., PUSCH, PUCCH) and other SRS resources (i.e., see 3GPP TS 38.211). For example, TDM multiplexing of SRS and PUSCH may be preferred. PUCCH may generally take priority over SRS, but aperiodic SRS which overlaps OFDM symbols of in the PUCCH may take priority in some instances. SRS may generally be TDM, FDM and CDM multiplexed with other resources, but some special cases may limit transmission of FDM/CDM'd SRS resources in the same OFDM symbol (e.g., if the two SRS would utilize the same power amplifier). Other antenna switching characteristics of a UE may limit multiplexing of two SRS resources. In an example, UE calibration may impact channel transitions such as when one symbol of a PUSCH 610a-b is frequency multiplexed with a symbol of a SRS resource 606a-b. A difference in transmit power between the PUSCH 610a-b and the SRS resource 606a-b may cause, for example, phase discontinuity in the SRS resource 606a-b. In this example, the UE may be configure to time align the channels such that the PUSCH 610a-b channels are time aligned, and the SRS resource 606a-b channels are time aligned with one another. Channel transmit power prioritization may be used to resolve collisions. For example, a UE may be configured such that PRACH transmissions may have priority over PUCCH transmissions, which may have a priority over PUSCH transmissions, which may have a priority over SRS transmissions. In such examples, the transmissions associated with the inferior channel may be dropped and/or the UE may be configured to allocate power according to the priority order.

Transmit power prioritization may also be applied to simultaneously transmitted SRS resources on the same component carriers, such as the first SRS resource 606a and the second SRS resource 606b. In an example, the transmit power of both SRS resources 606a-b may be decreased equally to meet a transmit power budget. In another example, the resource BW associated with a SRS resource may be assigned a priority and the UE may be configured to prioritize the power of the SRS in the higher priority resource BW. For example, the first resource BW 604a may be a higher priority of than the second resource BW 604a. The priority value may be based on an explicit indication (e.g., a parameter), or implicitly based on an index of the resource BWs 604a-b inside the active BWP 602. In another example, the priority value of a resource BW 604a-b may be based on an implicit configuration parameter such as the frequencies of the resource BW (e.g., lower frequencies may have higher priority). For example, the second resource BW 604b may have a higher priority than the first resource BW 604a because it is located in a relatively lower frequency region. The SRS resources may also be prioritized. For example, the triggering mechanism of an SRS resource may be used to prioritize the first or second SRS resources 606a-b over one another. Aperiodic SRS may have priority over semi-persistent SRS, which may have a priority over periodic SRS.

Figure 7:
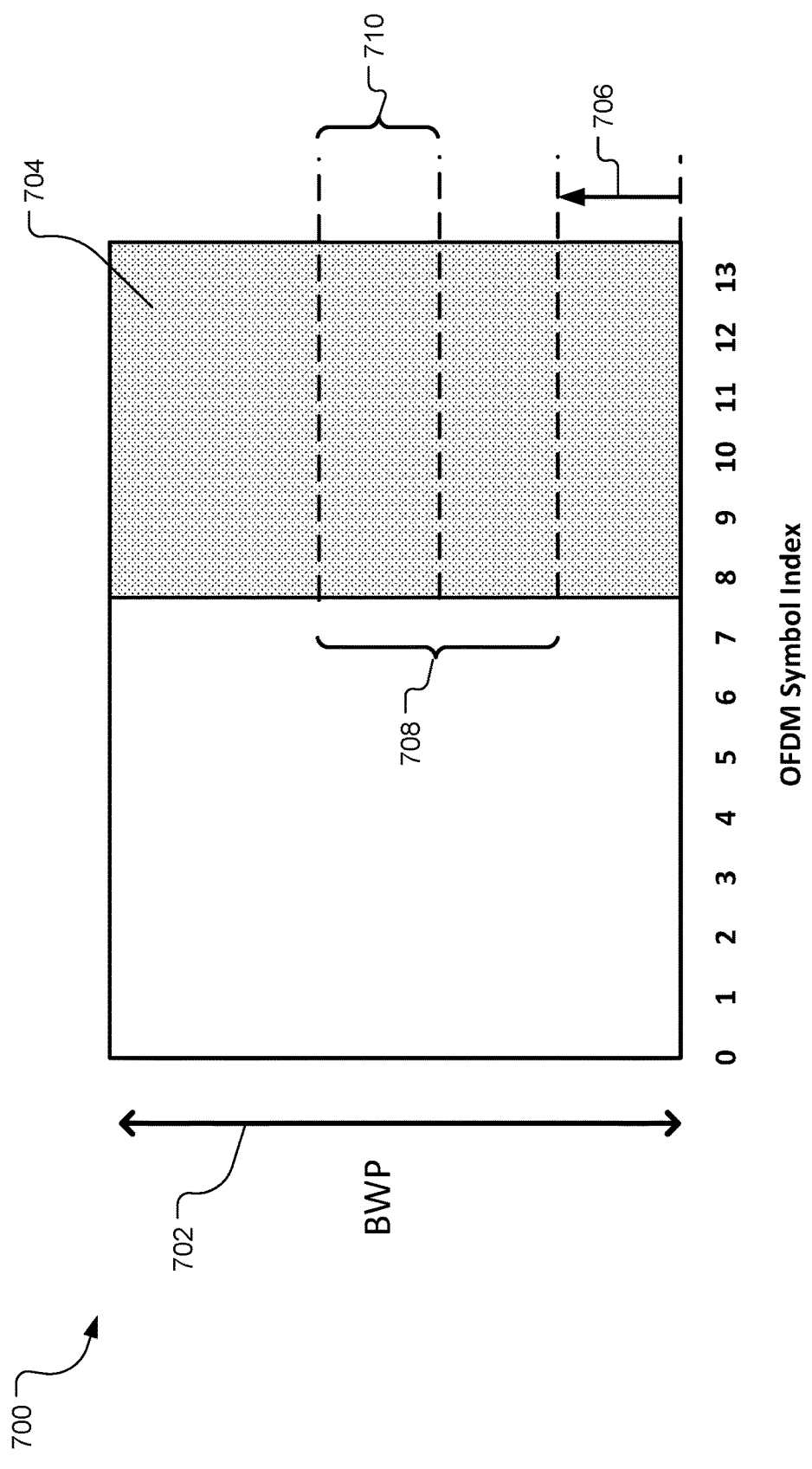
FIG. 7 illustrates time and frequency domain locations of an example SRS resource.

Referring to FIG. 7, an illustration of time and frequency domain locations of an example SRS resource slot 700 is shown. The slot 700 is within the frequency location defined in a bandwidth part (BWP) 702. In an example, the BWP 700 may represent a resource BW. In general, SRS in 5G NR may support different use cases and is less restrictive as compared to SRS in LTE. 5G NR SRS may be configured as either one, two, or four adjacent OFDM symbols within an allowed area 704 comprising the last six OFDM symbols of a slot. An SRS resource may utilize the allowed area 704 and thus may sound any arbitrary portion of the BWP 702. Frequency hopping may also be utilized within the allowed area 704. For example, a 2× or 4× repetition may be used to realize repetition over two or four OFDM symbols within the allowed area 704 before the next hop. The SRS may be aperiodic SRS triggered via DCI signaling, semi-persistent SRS triggered via MAC-CE, or periodic SRS (no triggering required). Typically, an SRS resource occupies resource elements of frequency domain comb structure with a comb spacing of either two or four resource elements. This comb structure enables multiplexing of different SRS resources of the same or different UEs on different combs. The different combs may be offset from each other by an integer number of resource elements. An SRS resource configuration may include an n-shift value 706 and an actual sounding bandwidth values 710 (i.e., b-hop and n-RRC values). The maximum sounding bandwidth value 708 is an indication of the maximum bandwidth within the BWP 702 that may be sounded. The bandwidth configuration of an SRS resource may be controlled by RRC parameters (e.g., $C_{srs}$, n-shift, $B_{srs}$, b-hop and n-RRC) which together define the portion of the allowed area 704 that may be sounded by an SRS resource.

Figure 8:
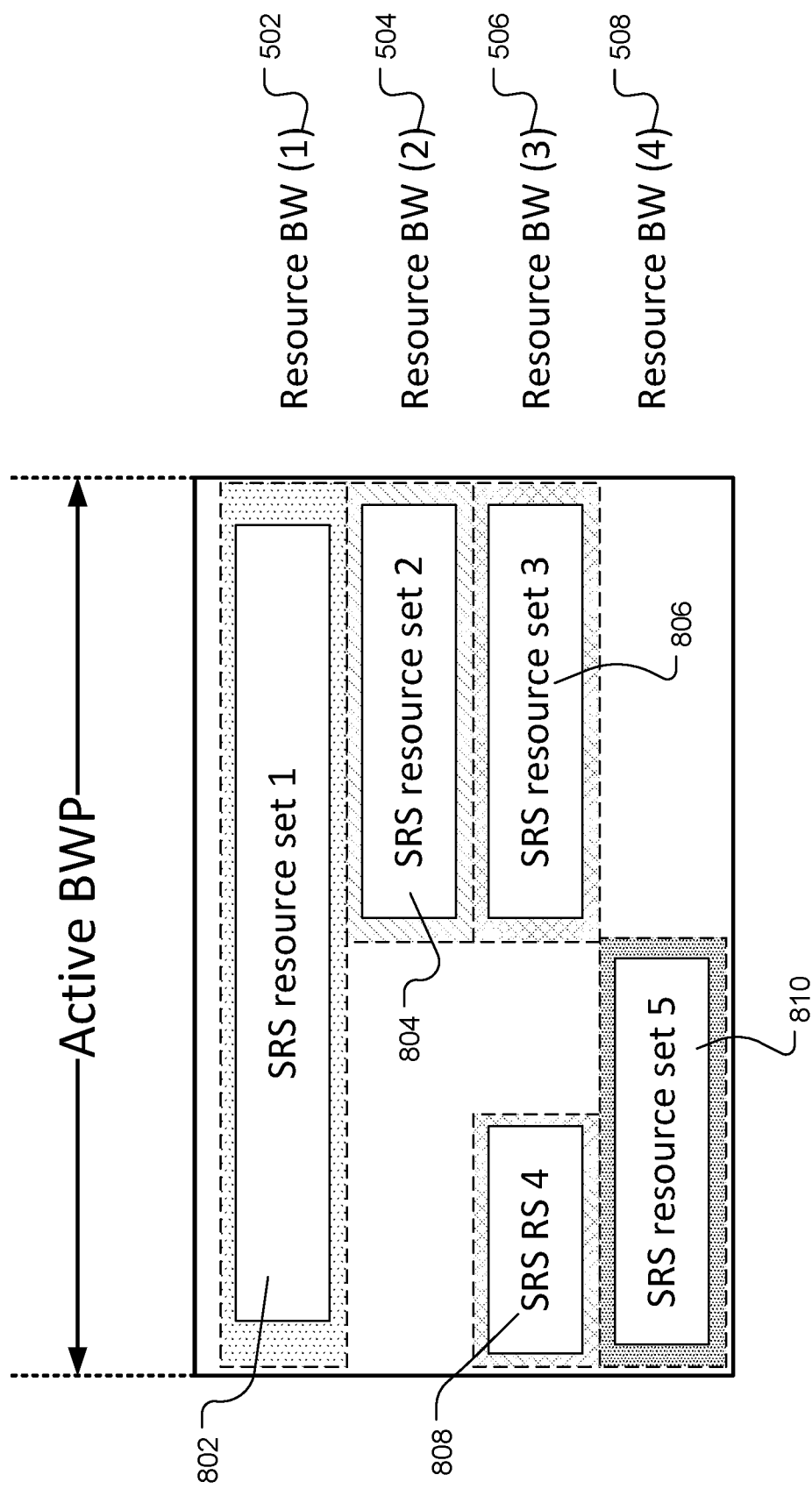
FIG. 8 illustrates example SRS resource sets within resource bandwidths.

Referring to FIG. 8, with further reference to FIGS. 5-7, example SRS resource sets within resource bandwidths are shown. Generally, SRS are configured within a SRS resource set which includes one or more SRS resources. Current specifications allow for up to 16 SRS resources to be linked to an SRS resource set (e.g., up to 16 instances of SRS-ResourceID belonging to srsResourceIdList in the currently defined SRS parameter structures). The capability of a UE may place limits on the maximum number of supported SRS resources (e.g., the maximum number of SRS resources within a BWP with an aperiodic trigger, the maximum number based on a usage, etc.). The SRS resource set/SRS resource configuration arrangement simplifies the activation for semi-persistent SRS and DCI triggering for aperiodic SRS because multiple resources may be activated/triggered simultaneously. The use cases for SRS, and the corresponding RRC configurations of a SRS resource set may contain a "usage" parameter. An SRS resource set may have different configurations based on the value of the usage parameter (e.g., the number of allowed sets, the number of allowed resources per set, etc.). Examples of usages include antenna switching, beam management, codebook-based SRS, non-codebook-based SRS, and SRS for positioning (see 3GPP 38.331). The configuration of the SRS resource sets can be part of an active BWP, but each of the SRS resources may be associated with one or more resource BWs. For example, a first SRS resource set 802 may be associated with the first resource BW 502. A second SRS resource set 804 may be associated with the second resource BW 504, a third SRS resource set 806 may be associated with the third resource BW 506. A fourth SRS resource set 808 may also be associated with the third resource BW 506. A fifth SRS resource 810 may be associated with the fourth resource BW 508. A many-to-many relationship between SRS resource sets and resource BW may exist such that one resource BW may be associated with many SRS resource sets, and/or one SRS resource set may be associated with many resource BWs. The configurations of SRS resources may be part of the active BWP, and each one of the SRS resources may be associated with one or more resource BWs. For example, the second SRS resource set 804 and the third SRS resource set 806 may be one SRS resource configuration that is associated with multiple resource BWs (i.e., the second and third resource BWs 504, 506). Pointer values may be used to associate the SRS resource parameters with a resource BW to reduce messaging overhead (i.e., as compared to repeating the SRS resources parameters within a resource BW). In an example, a pointer value may be based on an index value associated with a BWP and the SRS resource within the BWP.

Figure 9:
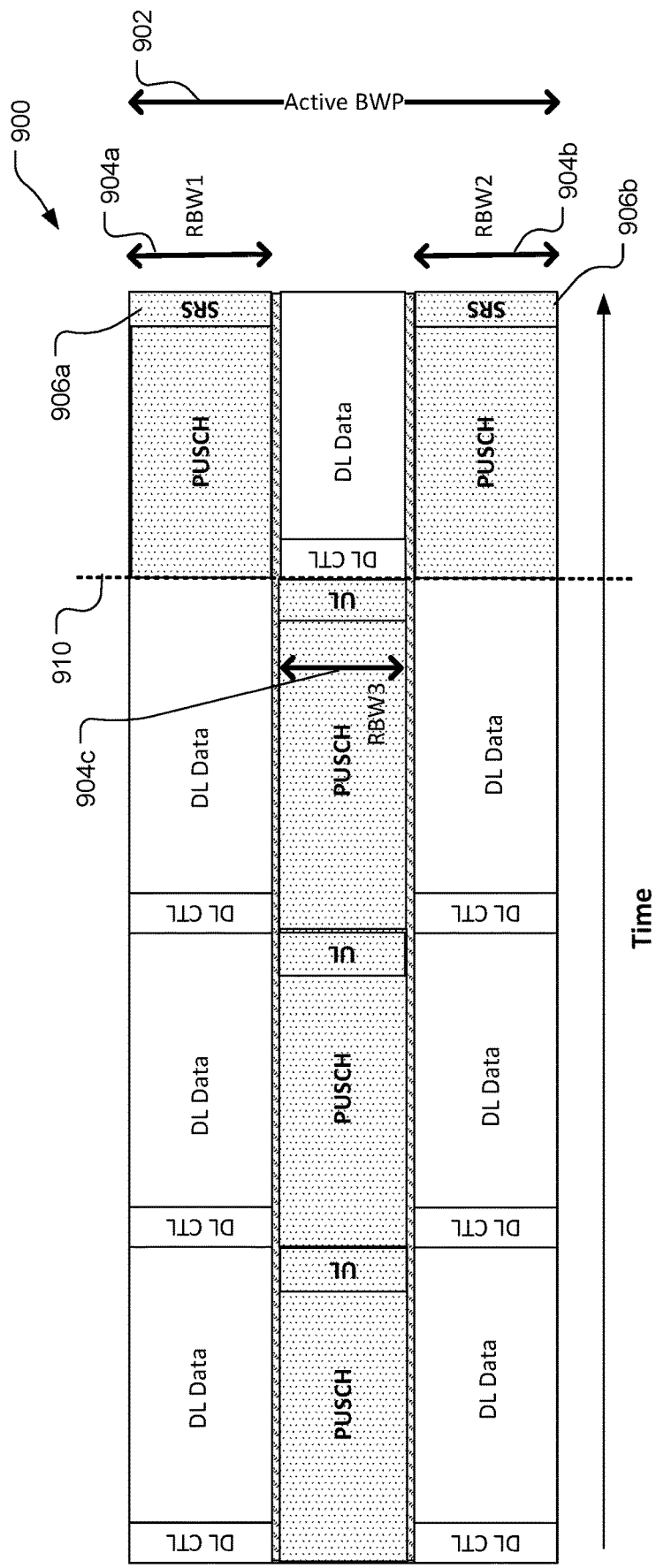
FIG. 9 illustrates an example spectrum for subband full duplex sounding reference signal (SRS) transmissions with a large active bandwidth part and two disjoint resource bandwidths.

Referring to FIG. 9, an example spectrum 900 for subband full duplex sounding reference signal (SRS) transmissions with a large active bandwidth part 902 and two disjoint resource bandwidths 904a-b is shown. The active BWP 902 may be configured via RRC and may be associated with the parameters for a first resource BW 904a and a second resource BW 904b (also referred to a first and second subband, respectively). The first resource BW 904a is associated with a first SRS resource set 906a, and the second resource BW 904b is associated with a second SRS resource set 906b. The first and second resource sets 906a-b may be the same SRS resource. For example, first and second resource sets 906a-b may be a pointer to SRS resource parameters associated with the active BWP 902. A UE may be configured to transmit PUSCH and/or the first and second SRS resources 906a-b concurrently with the respective resource BWs 904a. The parameters of the SRS resources 906a-b are associated with the respective parameters of the resource BWs 904a-b. For example, the symbol index of the SRS resources 906a-b may be relative to the first symbols in the respective resource BWs 904a-b. The symbols of the resource BWs 904a-b are in turn relative to the active BWP 902. A third resource BW 904c may also be configured within the active BWP 902. In the example spectrum 900, the third resource BW 904c may be utilized for the PUSCH and other UL control signaling. In an example, the third resource BW 904c may be associated with a third SRS resource set, or either of the first and second resource sets 906a-b.

In operation, the spectrum 900 may be utilized by a UE that is capable of tuning the active BWP 902 and may then utilize the resource BW 904a-c without a need for a retuning gap between the slots at the transition time 910. For example, the UE may be configured to tune internal RF circuits and bandpass filters based on the center frequency of the active BWP 902, and then utilize the resource BW 904a-c for SRS and UL and DL communications as depicted in FIG. 9. In an embodiment, the first and second resource BWs 904a-b may also enable reconfiguration of the resource BWs and the SRS resources via a DCI and MAC-CE signaling. Prioritization of the SRS resources may be applied for each SRS resource separately in each of the first and second resource BW 904a-b. In an example, the first and second SRS resources 906a-b are of the same usage and may be transmitted in the same symbols.

Figure 10:
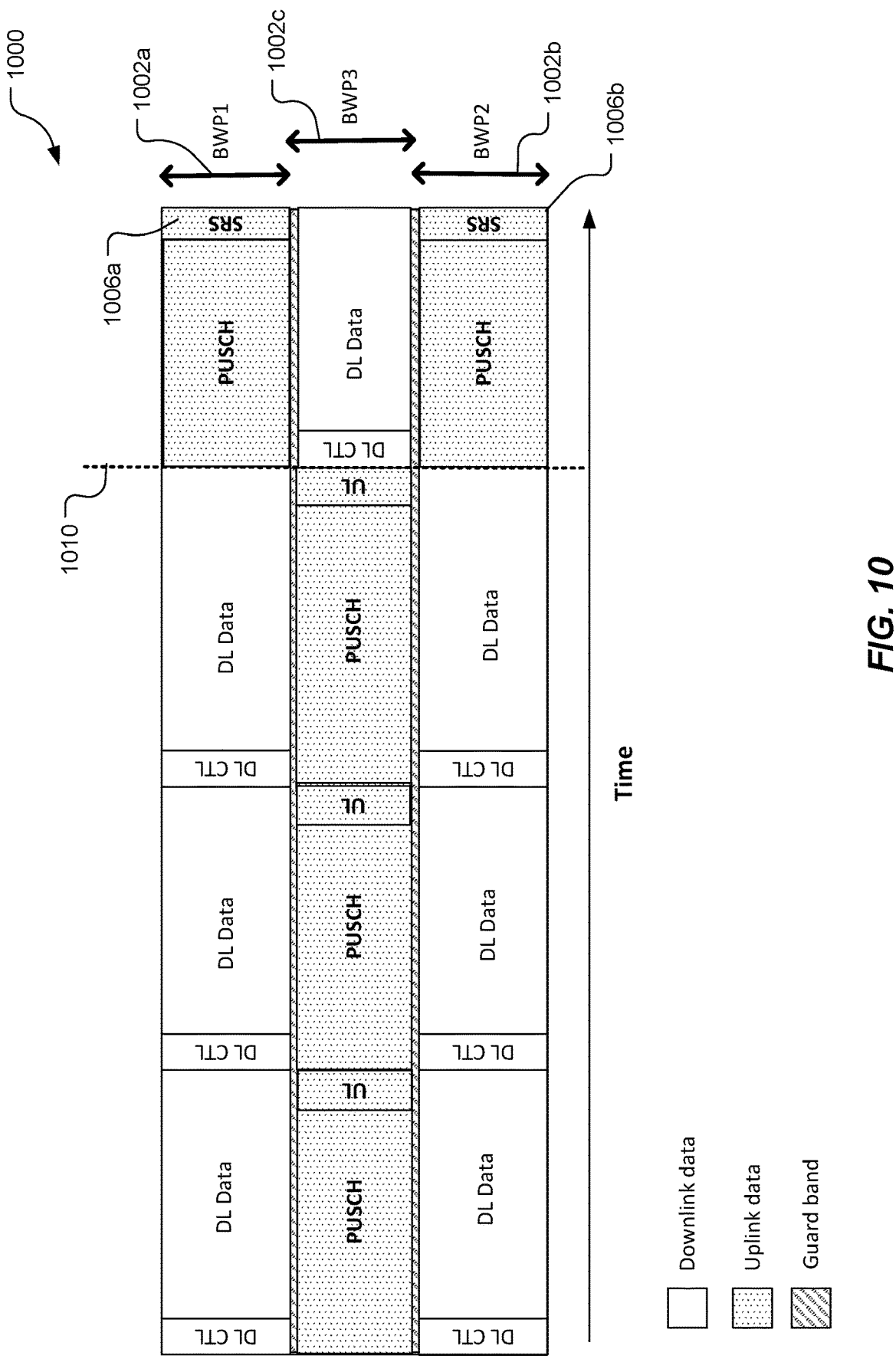
FIG. 10 illustrates an example spectrum for subband full duplex sounding reference signal (SRS) transmissions with two bandwidth parts that are simultaneously active.

Referring to FIG. 10, an example spectrum 1000 for subband full duplex sounding reference signal (SRS) transmission with two bandwidth parts that are simultaneously active is shown. The spectrum 1000 includes a first BWP 1002a and a second BWP 1002b which enable a UE to transmit PUSCH and SRS simultaneously. In this example, the BWPs form subbands on their own (i.e., each BWP may be considered a subband). A first SRS resource set 1006a may be associated with the first BWP 1002a and a second SRS resource set 1006b may be associated with the second BWP 1002b. A third BWP 1002c may be configured for the UL and DL channels as depicted in FIG. 10. In operation, a UE may be configured to switch between BWPs without retuning. For example, the UE may have multiple transmit and receive chains or other components to enable transmit and receive functions across a wide bandwidth. That is, the UE may be configured to change modes at the threshold time 1010 without a tuning gap. The BWPs 1002a-c may be associated with the center frequency and bandwidth. The parameters of the SRS resource sets 1006a-b may be relative to the respective BWPs 1002a-b. Since the first and second BWPs 1002a-b are simultaneously active, SRS resources in the first and second SRS resource sets 1006a-b may be transmitted simultaneously.

Figure 11:
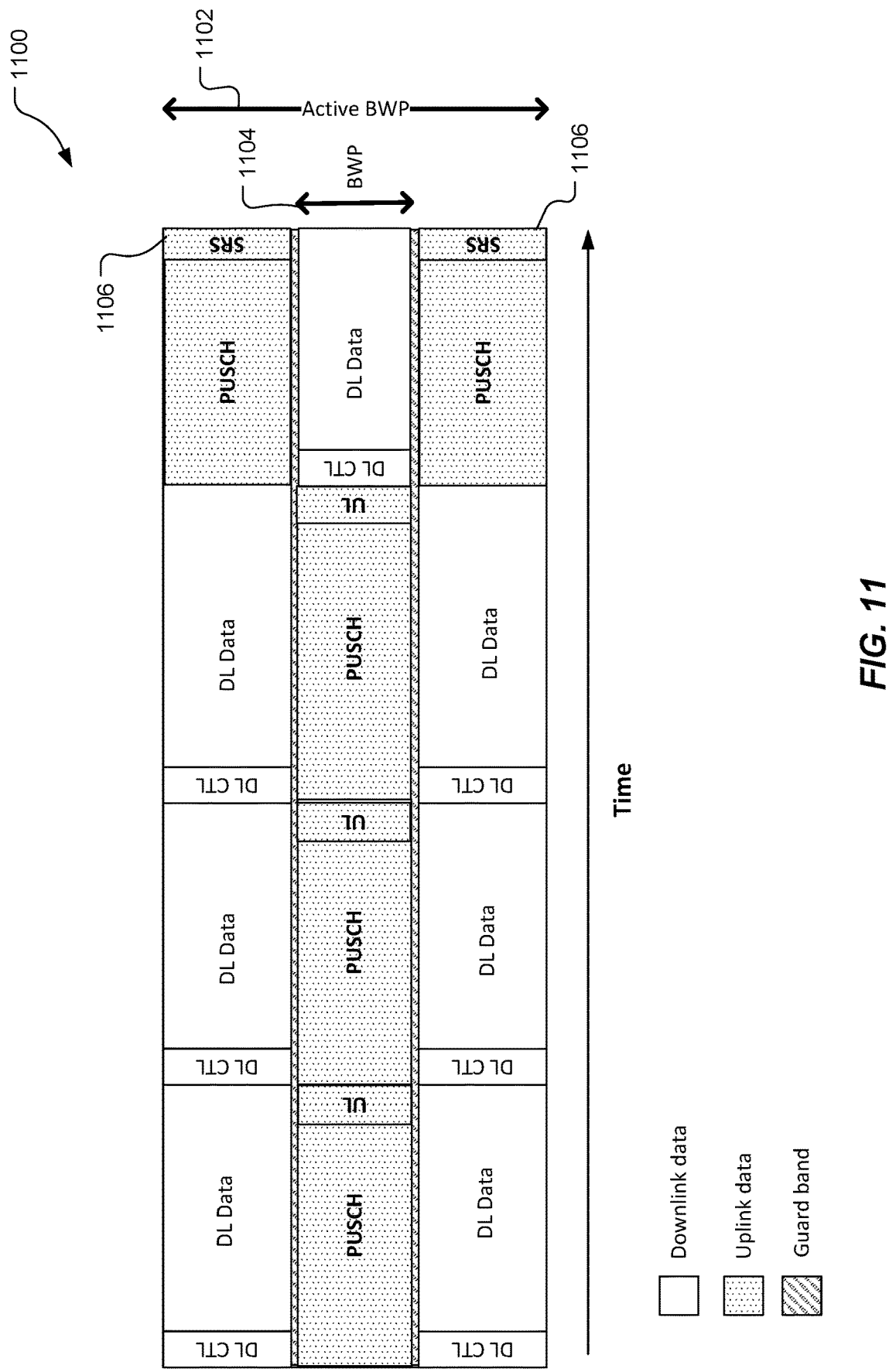
FIG. 11 illustrates an example spectrum for subband full duplex sounding reference signal (SRS) transmissions with a large active bandwidth part.

Referring to FIG. 11, an example spectrum 1100 for subband full duplex sounding reference signal (SRS) transmissions with a large active bandwidth part is shown. The spectrum 1100 includes a large active BWP 1102 and a second BWP 1104 within the active BWP 1102. A SRS resource set 1106 is defined within the active BWP 1102 via network implementation. That is, the SRS resources in the SRS resource set 1106 should be configured to not collide with the second BWP 1104 (i.e., the DL portion of the slot). The spectrum 1100 may be implemented for legacy systems based on the capabilities of legacy UEs.

Relative to the spectrum 900 of FIG. 9, the spectrum 1100 may limit the ability of the UE to react to channel collisions. For example, a DCI or MAC CE signal to trigger an SRS (e.g., aperiodic SRS, semi-persistent SRS) may cause a conflict with a PUSCH or another SRS. Since the SRS resource set 1106 is defined within the active BWP, there is no mechanism to assign a priority to an SRS resource relative to the PUSCH. In contrast, the spectrum 900 in FIG. 9 enables the assignment of priority to the resource BWs 904a-b (e.g., subband priority). In the event of a collision, the UE may utilize the priority assigned to the resource BWs 904a-b to prioritize power allocation for the PUSCH over the SRS in the event of a collision (e.g., the SRS may be dropped). The priority of the resource BWs 904a-b may be determined implicitly based on an index of the resource BWs 904a-b inside the active BWP 902, or it may be based on explicit indications within the respective resource BWs 904a-b. Frequency location may also be used to determine the priority of the resource BWs 904a-b (e.g., the second resource BW 904b with a relatively lower frequency may have a higher priority). The resource BWs 904a-b may also be used to resolve potential transmission power allocations between the simultaneously transmitted SRS 906a-b (e.g., aperiodic over semi-persistent over periodic). SRS prioritization with other channels may be applied for each SRS resource separately in each resource BW.

UE hardware and software configurations may impact the ability of a UE to utilize concurrent SRS resources. Fully capable UEs may be configured to FDM different types of SRS resources within different resource BWs such as depicted in FIG. 9. Reduced capability UEs (e.g., IoT devices, NR-Light UEs, etc.) may have limited capabilities to utilize concurrent SRS resources. In an example, a reduced capability UE may be configured to FDM the same-types of SRS resources within different resource BWs.

Other reduced capability UEs may be configured to FDM different-types of SRS resources that have the same time-domain behavior within different resource BWs. (e.g., periodic with periodic, aperiodic with aperiodic, etc.). Other UEs, such as legacy systems, may be configured to transmit one SRS resource at a time within different resource BWs.

Figure 12:
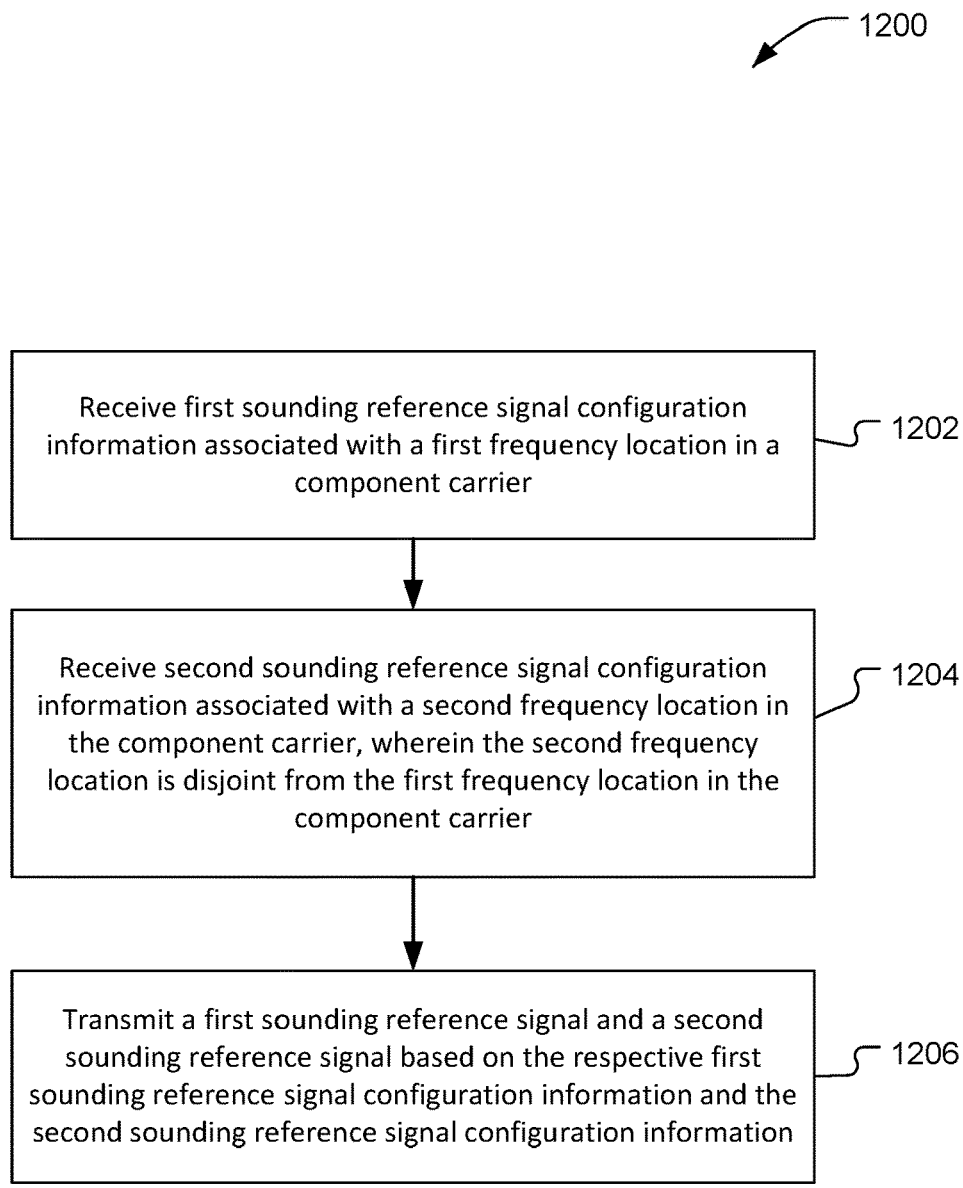
FIG. 12 is a flow diagram of an example method for facilitating a measurement of a propagation channel in a wireless network with user equipment.

Referring to FIG. 12, with further reference to FIGS. 1-11, a method 1200 for facilitating a measurement of a propagation channel in a wireless network includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes receiving first sounding reference signal configuration information associated with a first frequency location in a component carrier. A UE 120 is a means for receiving the first sounding reference signal information. In an example, a base station 110 is configured to transmit SRS resource set and SRS resource parameter structures via RRC or other signaling protocols. The first sounding reference signal information may include SRS resource parameters such as the n-shift value 706 and actual sounding bandwidth values 710 (i.e., b-hop and n-RRC values) depicted in FIG. 7. The first sounding reference signal information may further include $C_{srs}$, and $B_{srs}$ parameters which also define portions of the allowed area 704 that may be sounded. Referring to FIG. 6, as an example, the parameters in the first sounding reference signal information are configured to enable SRS transmission within a first frequency location 620 (e.g., as depicted by the first SRS resource 606a). In other examples, the first sounding reference signal information may correspond to the first SRS resource 1006a in FIG. 10, or the upper portion of the SRS resource 1106 in FIG. 11.

At stage 1204, the method includes receiving second sounding reference signal configuration information associated with a second frequency location in the component carrier, wherein the second frequency location is disjoint from the first frequency location in the component carrier. The UE 120 is a means for receiving the second sounding reference signal. In an example, the second sounding reference signal information may be included with the first sounding reference signal information. That is, a SRS resource set may include SRS resources for a plurality of SRS transmissions. The parameters of the first SRS resource may include the first sounding reference signal information, and the parameters of a second SRS resource may include the second sounding reference signal information. Referring to FIG. 6, as an example, the parameters in the second sounding reference signal information are configured to enable SRS transmission within a second frequency location 622 (e.g., as depicted by the second SRS resource 606b). In other examples, the second sounding reference signal information may correspond to the second SRS resource 1006b in FIG. 10, or the lower portion of the SRS resource 1106 in FIG. 11. The first and second frequency locations 620, 622 are disjoint in that they occupy frequencies (e.g., subcarriers) within the component carrier which do not overlap.

At stage 1206, the method includes transmitting a first sounding reference signal and a second sounding reference signal based on the respective first sounding reference signal configuration information and the second sounding reference signal configuration information. The UE 120 is a means for transmitting the first and second SRS. The first and second SRS signals are based on the parameters provided in the respective first and second sounding reference signal information. For example, referring to FIG. 7, the first and second sounding reference signals may be configured as either one, two, or four adjacent OFDM symbols within an allowed area 704 comprising the last six OFDM symbols of a slot. The first and second sounding reference signals may utilize the allowed area 704 and thus may sound different portions of the BWP 702. Frequency hopping may also be utilized within the allowed area 704. The first and second sounding reference signals may be transmitted simultaneously. For example, the UE may be configure to time align the first and second sounding reference signals such that the SRS channels are time aligned with one another. In some cases, however, the capabilities of the UE 120 may limit simultaneous transmissions. For example, reduced capability UEs (e.g., IoT devices, NR-Light UEs, etc.) may be configured to FDM the same-types of SRS resources, or to FDM different-types of SRS resources that have the same time-domain behavior (e.g., periodic with periodic, aperiodic with aperiodic, etc.). Other UEs, such as legacy systems, may be configured to transmit one SRS resource at a time.

In an embodiment, the UE 120 may be configured to receive bandwidth part information, such that the first frequency location and the second frequency location are within an active bandwidth part. The bandwidth part information may be configured to enable, for example, the active BWP 602 in FIG. 6, the BWPs 1002a-c in FIG. 10, and the BWPs 1102, 1104 in FIG. 11. The bandwidth part information may include associated resource bandwidth information (e.g., subbands), such that the first frequency location is associated with a first resource bandwidth within the active bandwidth part, and the second frequency location is associated with a second resource bandwidth within the active bandwidth part. The first and second resource BWs may be, for example, the first and second resource BWs 604a-b in FIG. 6, the resource BWs 904a-c in FIG. 9, or other resource BWs such as depicted in FIG. 5. The first and second resource BWs may be associated with the first and/or second sounding reference signal information.

Figure 13:
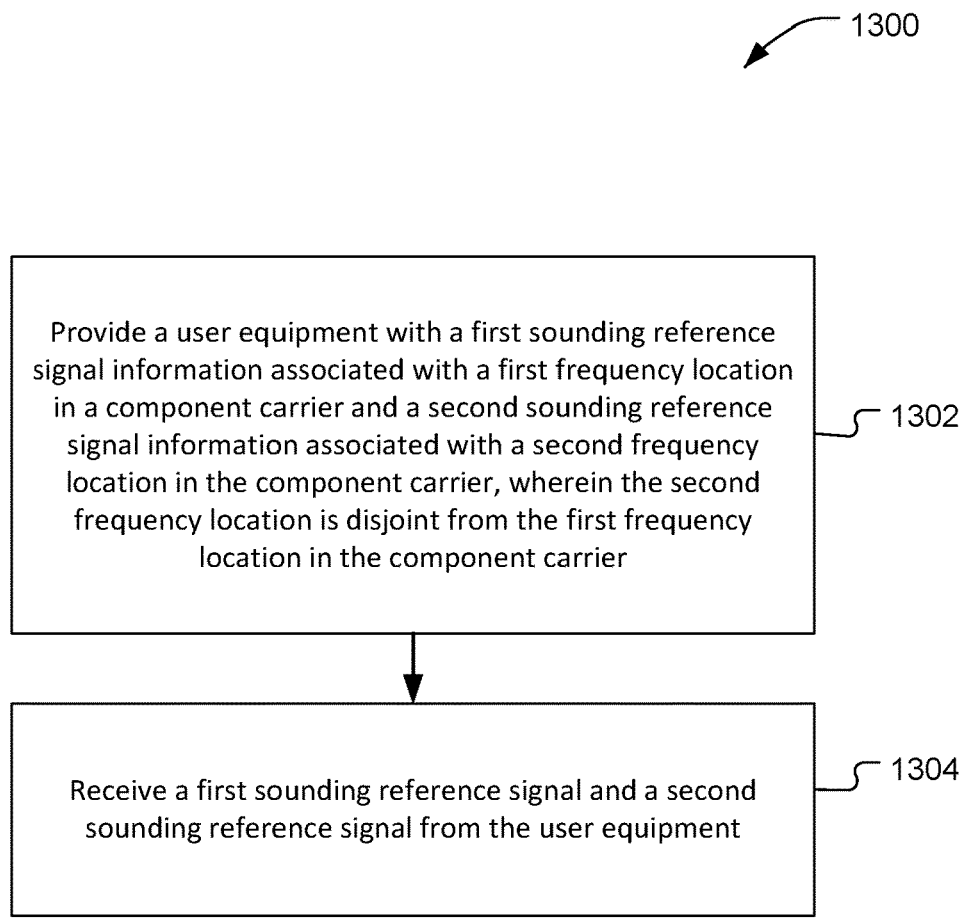
FIG. 13 is a flow diagram of an example method for facilitating a measurement of a propagation channel in a wireless network with a base station.

Referring to FIG. 13, with further reference to FIGS. 1-11, a method 1300 for facilitating a measurement of a propagation channel with a base station includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes providing a user equipment with a first sounding reference signal information associated with a first frequency location in a component carrier and a second sounding reference signal information associated with a second frequency location in the component carrier, wherein the second frequency location is disjoint from the first frequency location in the component carrier. A base station 110 is a means for providing the first and second sounding reference signal information. In an example, the base station 110 is configured to transmit SRS resource set and SRS resource parameter structures via RRC or other signaling protocols. The first and second sounding reference signal information may include SRS resource sets and SRS resource parameters for a plurality of SRS. The bandwidth configuration of each SRS resource may be controlled by RRC parameters (e.g., $C_{srs}$, n-shift, $B_{srs}$, b-hop and n-RRC) which together define the portion of the allowed area 704 that may be sounded by each of the respective SRS resources. Referring to FIG. 6, as an example, the parameters in the first and second sounding reference signal information are configured to enable SRS transmission within a first frequency location 620 (e.g., as depicted by the first SRS resource 606a) and the second frequency location 622 (e.g., as depicted by the second SRS resource 606b). In other examples, the first and second sounding reference signal information may correspond to the first and second SRS resources 1006a-b in FIG. 10, or the upper and lower portions of the SRS resource 1106 in FIG. 11. The first and second frequency locations 620, 622 are disjoint in that they occupy frequencies (e.g., subcarriers) within the component carrier which do not overlap.

At stage 1304, the method includes receiving a first sounding reference signal and a second sounding reference signal from the user equipment. The base station 110 is a means for receiving the first and second SRS. The first and second SRS signals are based on the parameters provided in the respective first and second sounding reference signal information. For example, referring to FIG. 7, the first and second sounding reference signals may be configured as either one, two, or four adjacent OFDM symbols within an allowed area 704 comprising the last six OFDM symbols of a slot. The first and second sounding reference signals may utilize the allowed area 704 and thus may sound different portions of the BWP 702. Frequency hopping may also be utilized within the allowed area 704. The first and second sounding reference signals may be transmitted simultaneously.

In an example, the base station 110, or other network server, may be configured to utilize the received first or second SRS to estimate the uplink propagation channel The SRS may be use to measure the uplink propagation for each resource block within an active BWP. A packet scheduler (e.g., the scheduler 244) may be configured to identify the best set of resource blocks to allocate. An uplink Signal to Interference to Noise ratio (SINR) may be measured from the SRS which may be used for link adaptation. The SRS may also be used to estimate the downlink propagation channel when channel reciprocity exists (e.g., TDD deployments). The base station 110 may use this information for DL transmissions to the UE 120. The SRS may be used for other beam management functions within a wireless network.

Figure 14:
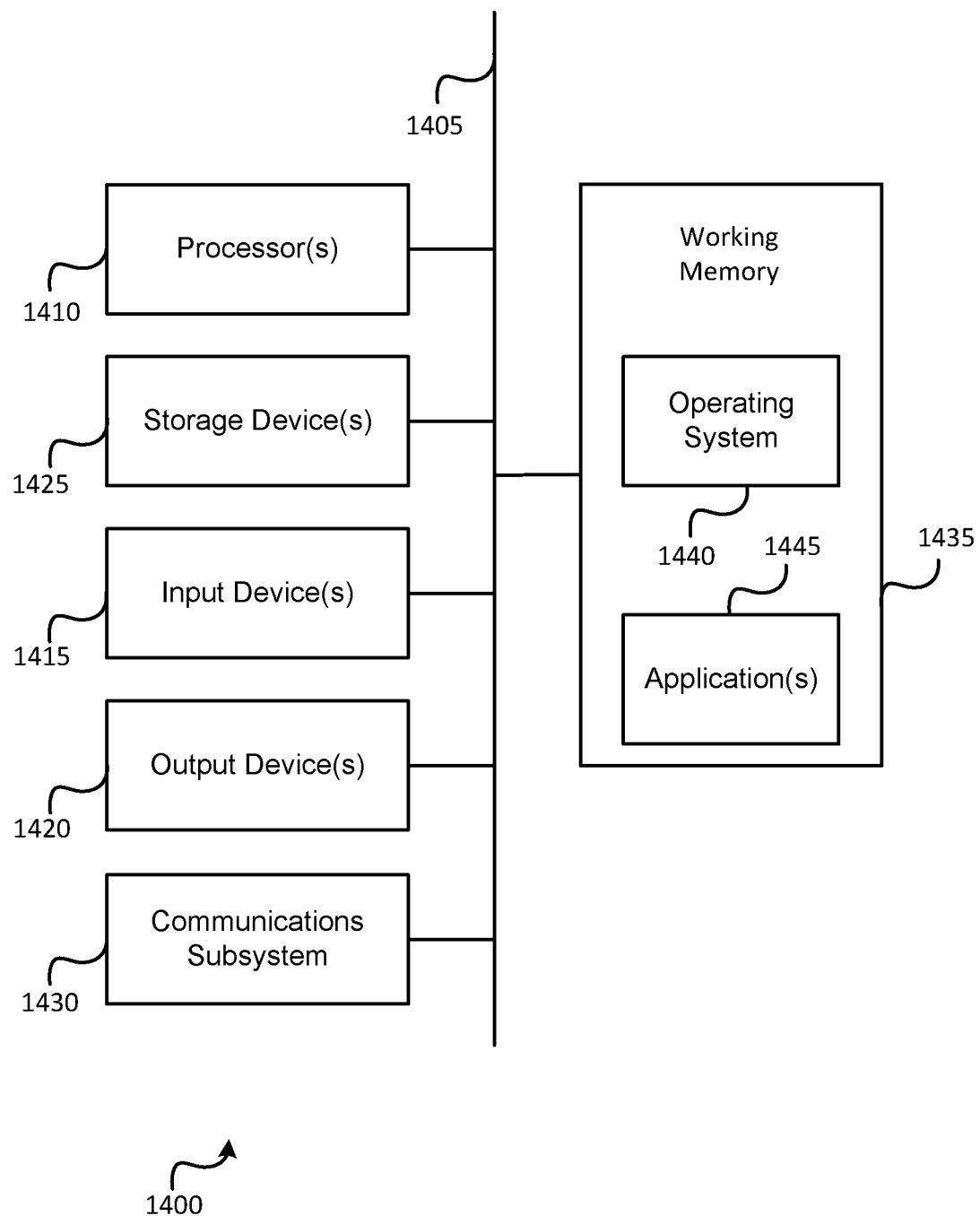
FIG. 14 illustrates a block diagram of an example of a computer system.

A computer system as illustrated in FIG. 14 may incorporate as part of the previously described computerized devices such as the BSs 110, UEs 120, and network controller 130. A computer system 1400 may be configured to perform the methods provided by various other embodiments, as described herein, and/or can function as a networked server, a mobile device, and/or a computer system. It should be noted that FIG. 14 is meant to provide a generalized illustration of various components, any or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which can include without limitation a mouse, a keyboard and/or the like; and one or more output devices 1420, which can include without limitation a display device, a printer and/or the like.

The computer system 1400 may further include (and/or be in communication with) one or more non-transitory storage devices 1425, which can comprise, without limitation, local and/or network accessible storage, and/or can include, without limitation, a disk drive, a drive array, an optical storage device, solid-state storage devices such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communications subsystem 1430, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1430 may permit data to be exchanged with a network, other computer systems, and/or any other devices described herein. In many embodiments, the computer system 1400 will further comprise a working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computer system, such as the system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1400) to perform methods in accordance with various embodiments of the disclosure. According to a set of embodiments, some or all of the procedures of such methods are performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communication subsystem 1430 (and/or the media by which the communications subsystem 1430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals and/or the like, are all examples of carrier waves on which instructions can be encoded, in accordance with various embodiments of the disclosure.

The communications subsystem 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a storage device 1425 either before or after execution by the processor(s) 1410.

Figure 15:
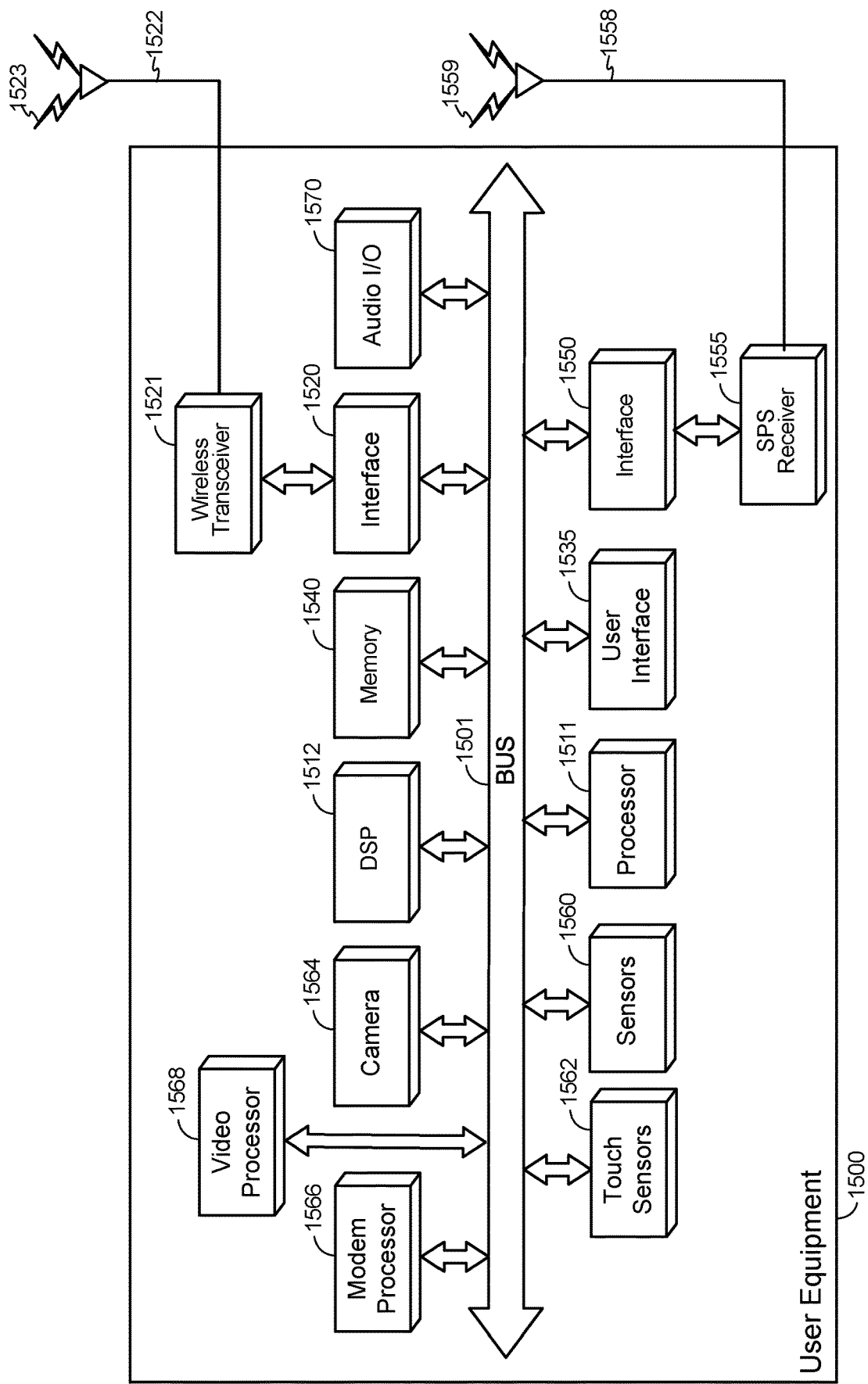
FIG. 15 is a block diagram of an example user equipment.

Referring to FIG. 15, a schematic diagram of a mobile device 1500 according to an embodiment is shown. The UE 120 as shown in FIG. 1 may comprise one or more features of the mobile device 1500 shown in FIG. 15 in addition to, in combination with, or in place of, the example components shown in FIG. 2. In certain embodiments, the mobile device 1500 may comprise a wireless transceiver 1521 which is capable of transmitting and receiving wireless signals 1523 via a wireless antenna 1522 over a wireless communication network. A wireless transceiver 1521 may be connected to a bus 1501 by a wireless transceiver bus interface 1520. The wireless transceiver bus interface 1520 may, in some embodiments, be at least partially integrated with the wireless transceiver 1521. Some embodiments may include multiple wireless transceivers 1521 and wireless antennas 1522 to enable transmitting and/or receiving signals in full or half duplex modes according to corresponding multiple wireless communication standards such as, for example, versions of IEEE Standard 802.11, CDMA, WCDMA, LTE, UMTS, GSM, AMPS, Zigbee, Bluetooth®, and a 5G or NR radio interface defined by 3GPP, just to name a few examples.

The mobile device 1500 may comprise an SPS receiver 1555 capable of receiving and acquiring SPS signals 1559 via an SPS antenna 1558 (which may be the same as the antenna 1522 in some embodiments). The SPS receiver 1555 may process, in whole or in part, the acquired SPS signals 1559 for estimating a location of the mobile device 1500. One or more general-purpose processor(s) 1511, a memory 1540, one or more digital signal processor(s) (DSP(s)) 1512, and/or specialized processors (not shown) may be utilized to process acquired SPS signals, in whole or in part, and/or to calculate an estimated location of the mobile device 1500, in conjunction with the SPS receiver 1555. The SPS receiver may be communicatively coupled to the bus 1501 via a SPS interface 1550. Storage of SPS, TPS or other signals (e.g., signals acquired from the wireless transceiver 1521) or storage of measurements of these signals for use in performing positioning operations may be performed in the memory 1540 or registers (not shown). The general-purpose processor(s) 1511, the memory 1540, the DSP(s) 1512, and/or specialized processors may provide or support a location engine for use in processing measurements to estimate a location of the mobile device 1500.

Also shown in FIG. 15, the DSP(s) 1512 and the general-purpose processor(s) 1511 may be connected to the memory 1540 through bus the 1501. A particular bus interface (not shown) may be integrated with the DSP(s) 1512, the general-purpose processor(s) 1511, and the memory 1540. In various embodiments, functions may be performed in response to execution of one or more machine-readable instructions stored in the memory 1540 such as on a computer-readable storage medium, such as RAM, ROM, FLASH, or disc drive, just to name a few examples. The one or more instructions may be executable by the general-purpose processor(s) 1511, specialized processors, or the DSP(s) 1512. The memory 1540 may comprise a non-transitory, processor-readable memory and/or a computer-readable memory that stores software code (programming code, instructions, etc.) that are executable by the processor(s) 1511 and/or the DSP(s) 1512 to perform functions described herein.

Also shown in FIG. 15, a user interface 1535 may comprise any one of several devices such as, for example, a speaker, microphone, display device, vibration device, keyboard, touch screen, just to name a few examples. In a particular implementation, the user interface 1535 may enable a user to interact with one or more applications hosted on the mobile device 1500. For example, devices of the user interface 1535 may store analog and/or digital signals on the memory 1540 to be further processed by the DSP(s) 1512 or the general purpose processor 1511 in response to action from a user. Similarly, applications hosted on the mobile device 1500 may store analog or digital signals on the memory 1540 to present an output signal to a user. The mobile device 1500 may optionally include a dedicated audio input/output (I/O) device 1570 comprising, for example, a dedicated speaker, microphone, digital to analog circuitry, analog to digital circuitry, amplifiers and/or gain control. This is merely an example of how an audio I/O may be implemented in a mobile device, and claimed subject matter is not limited in this respect. The mobile device 1500 may comprise touch sensors 1562 responsive to touching or pressure on a keyboard or touch screen device.

The mobile device 1500 may comprise a dedicated camera device 1564 for capturing still or moving imagery. The camera device 1564 may comprise, for example, an imaging sensor (e.g., charge coupled device or CMOS imager), lens, analog-to-digital circuitry, frame buffers, just to name a few examples. Additional processing, conditioning, encoding, and/or compression of signals representing captured images may be performed at the general purpose/application processor 1511 and/or the DSP(s) 1512. A dedicated video processor 1562 may perform conditioning, encoding, compression or manipulation of signals representing captured images. A video processor 1568 may decode/decompress stored image data for presentation on a display device (not shown) on the mobile device 1500.

The mobile device 1500 may also comprise sensors 1560 coupled to the bus 1501 which may include, for example, inertial sensors and environment sensors. Inertial sensors of the sensors 1560 may comprise, for example, accelerometers (e.g., collectively responding to acceleration of the mobile device 1500 in three dimensions), one or more gyroscopes or one or more magnetometers (e.g., to support one or more compass applications). Environment sensors of the mobile device 1500 may comprise, for example, temperature sensors, barometric pressure sensors, ambient light sensors, camera imagers, microphones, just to name few examples. The sensors 1560 may generate analog and/or digital signals that may be stored in the memory 1540 and processed by the DPS(s) 1512 or the general purpose application processor 1511 in support of one or more applications such as, for example, applications directed to positioning or navigation operations.

The mobile device 1500 may comprise a dedicated modem processor 1566 capable of performing baseband processing of signals received and downconverted at the wireless transceiver 1521 or the SPS receiver 1555. The modem processor 1566 may perform baseband processing of signals to be upconverted for transmission by the wireless transceiver 1521. In alternative implementations, instead of having a dedicated modem processor, baseband processing may be performed by a general purpose processor or DSP (e.g., the general purpose/application processor 1511 or the DSP(s) 1512). These are merely examples of structures that may perform baseband processing, and claimed subject matter is not limited in this respect.

Figure 16:
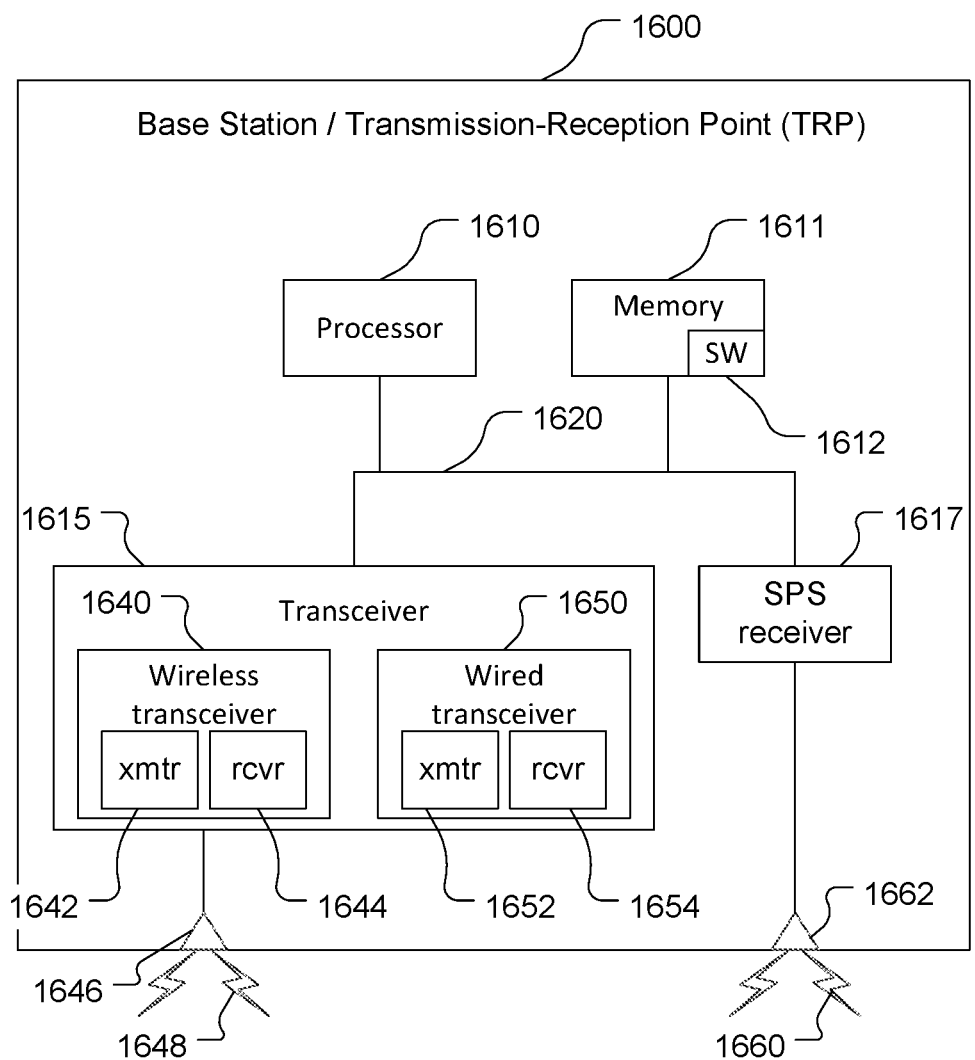
FIG. 16 is a block diagram of an example base station.

Referring also to FIG. 16, an example of a TRP 1600 of the BSs 110*a-c* comprises a computing platform including a processor 1610, memory 1611 including software (SW) 1612, a transceiver 1615, and (optionally) an SPS receiver 1617. The processor 1610, the memory 1611, the transceiver 1615, and the SPS receiver 1617 may be communicatively coupled to each other by a bus 1620 (which may be configured, e.g., for optical and/or electrical communication). One or more of the shown apparatus (e.g., a wireless interface and/or the SPS receiver 1617) may be omitted from the TRP 1600. The SPS receiver 1617 may be configured similarly to the SPS receiver 1555 to be capable of receiving and acquiring SPS signals 1660 via an SPS antenna 1662. The processor 1610 may include one or more intelligent hardware devices, e.g., a central processing unit (CPU), a microcontroller, an application specific integrated circuit (ASIC), etc. The processor 1610 may comprise multiple processors (e.g., including a general-purpose/application processor, a DSP, a modem processor, a video processor, and/or a sensor processor). The memory 1611 is a non-transitory storage medium that may include random access memory (RAM)), flash memory, disc memory, and/or read-only memory (ROM), etc. The memory 1611 stores the software 1612 which may be processor-readable, processor-executable software code containing instructions that are configured to, when executed, cause the processor 1610 to perform various functions described herein. Alternatively, the software 1612 may not be directly executable by the processor 1610 but may be configured to cause the processor 1610, e.g., when compiled and executed, to perform the functions. The description may refer to the processor 1610 performing a function, but this includes other implementations such as where the processor 1610 executes software and/or firmware. The description may refer to the processor 1610 performing a function as shorthand for one or more of the processors contained in the processor 1610 performing the function. The description may refer to the TRP 1600 performing a function as shorthand for one or more appropriate components of the TRP 1600 (and thus of one of the BSs 110*a-c*) performing the function. The processor 1610 may include a memory with stored instructions in addition to and/or instead of the memory 1611. Functionality of the processor 1610 is discussed more fully below.

The transceiver 1615 may include a wireless transceiver 1640 and a wired transceiver 1650 configured to communicate with other devices through wireless connections and wired connections, respectively. For example, the wireless transceiver 1640 may include a transmitter 1642 and receiver 1644 coupled to one or more antennas 1646 for transmitting (e.g., on one or more uplink channels) and/or receiving (e.g., on one or more downlink channels) wireless signals 1648 and transducing signals from the wireless signals 1648 to wired (e.g., electrical and/or optical) signals and from wired (e.g., electrical and/or optical) signals to the wireless signals 1648. Thus, the transmitter 1642 may include multiple transmitters that may be discrete components or combined/integrated components, and/or the receiver 1644 may include multiple receivers that may be discrete components or combined/integrated components. The wireless transceiver 1640 may be configured to communicate signals (e.g., with the UE 120, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 1650 may include a transmitter 1652 and a receiver 1654 configured for wired communication, e.g., with the network controller 130 to send communications to, and receive communications from, the network controller 130, for example. The transmitter 1652 may include multiple transmitters that may be discrete components or combined/integrated components, and/or the receiver 1654 may include multiple receivers that may be discrete components or combined/integrated components. The wired transceiver 1650 may be configured, e.g., for optical communication and/or electrical communication.

The configuration of the TRP 1600 shown in FIG. 16 is an example and not limiting of the disclosure, including the claims, and other configurations may be used. For example, the description herein discusses that the TRP 1600 is configured to perform or performs several functions, but one or more of these functions may be performed by the computer 1400 and/or the UE 120 (i.e., the UE 120 may be configured to perform one or more of these functions).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims.

Implementation examples are described in the following numbered clauses:

1. A method for facilitating a measurement of a propagation channel in a wireless network, comprising:
   receiving first sounding reference signal configuration information associated with a first frequency location in a component carrier;
   receiving second sounding reference signal configuration information associated with a second frequency location in the component carrier, wherein the second frequency location is disjoint from the first frequency location in the component carrier; and
   transmitting a first sounding reference signal and a second sounding reference signal based on the respective first sounding reference signal configuration information and the second sounding reference signal configuration information.
2. The method of clause 1 further comprising receiving bandwidth part information, wherein the first frequency location and the second frequency location are within an active bandwidth part.
3. The method of clause 2 further comprising receiving resource bandwidth information, wherein the first frequency location is associated with a first resource bandwidth within the active bandwidth part, and the second frequency location is associated with a second resource bandwidth within the active bandwidth part.
4. The method of clause 3 wherein the first resource bandwidth is associated with a first priority value and the second resource bandwidth is associated with a second priority value.
5. The method of clause 4 wherein the user equipment is configured to prioritize transmit power based on the first priority value and the second priority value.
6. The method of clause 2 wherein the first frequency location is associated with a first bandwidth part and the second frequency location is associated with a second bandwidth part.
7. The method of clause 1 wherein the first sounding reference signal and the second sounding reference signal are transmitted simultaneously.
8. The method of clause 7 wherein the first sounding reference signal and the second sounding reference signal have the same usage.
9. The method of clause 7 wherein a transmit power for the first sounding reference signal and a transmit power for the second sounding reference signal are equally decreased to meet a transmit power budget for the user equipment.
10. The method of clause 1 further comprising:
    determining a capability of the user equipment; and
    transmitting the first sounding reference signal and the second sounding reference signal based at least in part on the capability of the user equipment.
11. The method of clause 10 wherein the first sounding reference signal and the second sounding reference signal are a same type of sounding reference signal, and the user equipment is configured to frequency division multiplex the first sounding reference signal and the second sounding reference signal.

12. The method of clause 10 wherein the first sounding reference signal and the second sounding reference signal are different types of sounding reference signal with a same time-domain behavior, and the user equipment is configured to frequency division multiplex the first sounding reference signal and the second sounding reference signal.

13. The method of clause 10 wherein the user equipment is configured to transmit the first sounding reference signal and the second sounding reference signal one at a time.

14. A method for facilitating a measurement of a propagation channel in a wireless network, comprising:
providing a user equipment with a first sounding reference signal information associated with a first frequency location in a component carrier and a second sounding reference signal information associated with a second frequency location in the component carrier, wherein the second frequency location is disjoint from the first frequency location in the component carrier; and
receiving a first sounding reference signal and a second sounding reference signal from the user equipment.

15. The method of clause 14 further comprising providing bandwidth part information to the user equipment, wherein the first frequency location and the second frequency location are within an active bandwidth part.

16. The method of clause 15 further comprising providing resource bandwidth information to the user equipment, wherein the first frequency location is associated with a first resource bandwidth within the active bandwidth part, and the second frequency location is associated with a second resource bandwidth within the active bandwidth part.

17. The method of clause 16 wherein the first resource bandwidth is associated with a first priority value and the second resource bandwidth is associated with a second priority value.

18. The method of clause 14 wherein the first frequency location is associated with a first bandwidth part and the second frequency location is associated with a second bandwidth part.

19. The method of clause 14 wherein the first sounding reference signal and the second sounding reference signal are received simultaneously.

20. The method of clause 14 wherein the first sounding reference signal and the second sounding reference signal have the same usage.

21. The method of clause 14 wherein the first sounding reference signal information and the second sounding reference signal information are provided to the user equipment via radio resource control signaling.

22. The method of clause 14 wherein the first sounding reference signal information and the second sounding reference signal information are provided to the user equipment via one or more system information blocks.

23. The method of clause 14 further comprising providing a trigger signal configured to cause the user equipment to transmit at least one of the first sounding reference signal or the second sounding reference signal.

24. The method of clause 23 wherein the trigger signal is within a Medium Access Control Control Element (MAC CE) signal.

25. The method of clause 23 wherein the trigger signal is within a Downlink Control Information (DCI) signal.

26. An apparatus configured to operate in a subband full duplex mode including transmitting and receiving on the same Orthogonal Frequency-Division Multiplexing (OFDM) symbols on different subbands of a component carrier, comprising:
a memory;
at least one transceiver;
at least one processor communicatively coupled to the memory and the at least one transceiver and configured to:
receive first sounding reference signal configuration information associated with a first frequency location in the component carrier;
receive second sounding reference signal configuration information associated with a second frequency location in the component carrier, wherein the second frequency location is disjoint from the first frequency location in the component carrier; and
transmit a first sounding reference signal and a second sounding reference signal based on the respective first sounding reference signal configuration information and the second sounding reference signal configuration information.

27. The apparatus of clause 26 wherein the at least one processor is further configured to receive bandwidth part information, wherein the first frequency location and the second frequency location are within an active bandwidth part.

28. The apparatus of clause 27 wherein the at least one processor is further configured to receive resource bandwidth information, wherein the first frequency location is associated with a first resource bandwidth within the active bandwidth part, and the second frequency location is associated with a second resource bandwidth within the active bandwidth part.

29. The apparatus of clause 28 wherein the first resource bandwidth is associated with a first priority value and the second resource bandwidth is associated with a second priority value.

30. The apparatus of clause 29 wherein the at least one processor is further configured to prioritize transmit power based on the first priority value and the second priority value.

31. The apparatus of clause 27 wherein the first frequency location is associated with a first bandwidth part and the second frequency location is associated with a second bandwidth part.

32. The apparatus of clause 26 wherein the first sounding reference signal and the second sounding reference signal are transmitted simultaneously.

33. The apparatus of clause 32 wherein the first sounding reference signal and the second sounding reference signal have the same usage.

34. The apparatus of clause 32 wherein a transmit power for the first sounding reference signal and a transmit power for the second sounding reference signal are equally decreased to meet a transmit power budget for a user equipment.

35. The apparatus of clause 26 wherein the at least one processor is further configured to:
determine a capability of a user equipment; and
transmit the first sounding reference signal and the second sounding reference signal based at least in part on the capability of the user equipment.

36. The apparatus of clause 35 wherein the first sounding reference signal and the second sounding reference signal are a same type of sounding reference signal, and the user equipment is configured to frequency division multiplex the first sounding reference signal and the second sounding reference signal.
37. The apparatus of clause 35 wherein the first sounding reference signal and the second sounding reference signal are different types of sounding reference signal with a same time-domain behavior, and the user equipment is configured to frequency division multiplex the first sounding reference signal and the second sounding reference signal.
38. The apparatus of clause 35 wherein the user equipment is configured to transmit the first sounding reference signal and the second sounding reference signal one at a time.
39. An apparatus for facilitating a measurement of a propagation channel in a wireless network, comprising:
a memory;
at least one transceiver;
at least one processor communicatively coupled to the memory and the at least one transceiver and configured to:
provide a user equipment with a first sounding reference signal information associated with a first frequency location in a component carrier and a second sounding reference signal information associated with a second frequency location in the component carrier, wherein the second frequency location is disjoint from the first frequency location in the component carrier; and
receive a first sounding reference signal and a second sounding reference signal from the user equipment.
40. The apparatus of clause 39 wherein the at least one processor is further configured to provide bandwidth part information to the user equipment, wherein the first frequency location and the second frequency location are within an active bandwidth part.
41. The apparatus of clause 40 wherein the at least one processor is further configured to provide resource bandwidth information to the user equipment, wherein the first frequency location is associated with a first resource bandwidth within the active bandwidth part, and the second frequency location is associated with a second resource bandwidth within the active bandwidth part.
42. The apparatus of clause 41 wherein the first resource bandwidth is associated with a first priority value and the second resource bandwidth is associated with a second priority value.
43. The apparatus of clause 39 wherein the first frequency location is associated with a first bandwidth part and the second frequency location is associated with a second bandwidth part.
44. The apparatus of clause 39 wherein the first sounding reference signal and the second sounding reference signal are received simultaneously.
45. The apparatus of clause 39 wherein the first sounding reference signal and the second sounding reference signal have the same usage.
46. The apparatus of clause 39 wherein the first sounding reference signal information and the second sounding reference signal information are provided to the user equipment via radio resource control signaling.
47. The apparatus of clause 39 wherein the first sounding reference signal information and the second sounding reference signal information are provided to the user equipment via one or more system information blocks.
48. The apparatus of clause 39 wherein the at least one processor is further configured to provide a trigger signal configured to cause the user equipment to transmit at least one of the first sounding reference signal or the second sounding reference signal.
49. The apparatus of clause 48 wherein the trigger signal is within a Medium Access Control Control Element (MAC CE) signal.
50. The apparatus of clause 48 wherein the trigger signal is within a Downlink Control Information (DCI) signal.
51. An apparatus for facilitating a measurement of a propagation channel in a wireless network, comprising:
means for receiving first sounding reference signal configuration information associated with a first frequency location in a component carrier;
means for receiving second sounding reference signal configuration information associated with a second frequency location in the component carrier, wherein the second frequency location is disjoint from the first frequency location in the component carrier; and
means for transmitting a first sounding reference signal and a second sounding reference signal based on the respective first sounding reference signal configuration information and the second sounding reference signal configuration information.
52. An apparatus for facilitating a measurement of a propagation channel in a wireless network, comprising:
means for providing a user equipment with a first sounding reference signal information associated with a first frequency location in a component carrier and a second sounding reference signal information associated with a second frequency location in the component carrier, wherein the second frequency location is disjoint from the first frequency location in the component carrier; and
means for receiving a first sounding reference signal and a second sounding reference signal from the user equipment.
53. A non-transitory processor-readable storage medium comprising processor-readable instructions configured to cause one or more processors to facilitate a measurement of a propagation channel in a wireless network, comprising:
code for receiving first sounding reference signal configuration information associated with a first frequency location in a component carrier;
code for receiving second sounding reference signal configuration information associated with a second frequency location in the component carrier, wherein the second frequency location is disjoint from the first frequency location in the component carrier; and
code for transmitting a first sounding reference signal and a second sounding reference signal based on the respective first sounding reference signal configuration information and the second sounding reference signal configuration information.
54. A non-transitory processor-readable storage medium comprising processor-readable instructions configured to cause one or more processors to facilitate a measurement of a propagation channel in a wireless network, comprising:
code for providing a user equipment with a first sounding reference signal information associated with a first frequency location in a component carrier and a second sounding reference signal information associated with a second frequency location in the component carrier, wherein the second frequency location is disjoint from the first frequency location in the component carrier; and code for receiving a first sounding reference signal and a second sounding reference signal from the user equipment.

What is claimed is:

1. A method for facilitating a measurement of a propagation channel in a wireless network, comprising:
   receiving first sounding reference signal configuration information associated with a first frequency location in a component carrier;
   receiving second sounding reference signal configuration information associated with a second frequency location in the component carrier, being the same component carrier that includes the first frequency location, wherein the second frequency location is disjoint from the first frequency location in the component carrier; and
   transmitting, simultaneously, a first sounding reference signal and a second sounding reference signal within an active bandwidth part and based on the respective first sounding reference signal configuration information and the second sounding reference signal configuration information.

2. The method of claim 1 further comprising receiving resource bandwidth information, wherein the first frequency location is associated with a first resource bandwidth within the active bandwidth part, and the second frequency location is associated with a second resource bandwidth within the active bandwidth part.

3. The method of claim 2 wherein the first resource bandwidth is associated with a first priority value and the second resource bandwidth is associated with a second priority value.

4. The method of claim 3 wherein a user equipment is configured to prioritize transmit power based on the first priority value and the second priority value.

5. The method of claim 1 wherein the first frequency location is associated with a first bandwidth part and the second frequency location is associated with a second bandwidth part.

6. The method of claim 1 wherein the first sounding reference signal and the second sounding reference signal have the same usage including at least one of antenna switching, beam management, a codebook-based sounding reference signal, a noncodebood-based sounding reference signal, and a sounding reference signal for positioning.

7. The method of claim 1 wherein a transmit power for the first sounding reference signal and a transmit power for the second sounding reference signal are equally decreased to meet a transmit power budget for a user equipment.

8. The method of claim 1 further comprising:
   determining a capability of a user equipment; and
   transmitting the first sounding reference signal and the second sounding reference signal based at least in part on the capability of the user equipment.

9. The method of claim 8 wherein the first sounding reference signal and the second sounding reference signal are a same type of sounding reference signal, and the user equipment is capable of frequency division multiplexing the first sounding reference signal and the second sounding reference signal.

10. The method of claim 8 wherein the first sounding reference signal and the second sounding reference signal are different types of sounding reference signal with a same time-domain behavior, and the user equipment is capable of frequency division multiplexing the first sounding reference signal and the second sounding reference signal.

11. The method of claim 8 wherein the user equipment is configured to transmit the first sounding reference signal and the second sounding reference signal one at a time.

12. An apparatus configured to operate in a subband full duplex mode including transmitting and receiving on the same Orthogonal Frequency-Division Multiplexing (OFDM) symbols on different subbands of a component carrier, comprising:
   a memory;
   at least one transceiver;
   at least one processor communicatively coupled to the memory and the at least one transceiver and configured to:
      receive first sounding reference signal configuration information associated with a first frequency location in the component carrier;
      receive second sounding reference signal configuration information associated with a second frequency location in the component carrier, being the same component carrier that includes the first frequency location, wherein the second frequency location is disjoint from the first frequency location in the component carrier; and
      transmit, simultaneously a first sounding reference signal and a second sounding reference signal within an active bandwidth part and based on the respective first sounding reference signal configuration information and the second sounding reference signal configuration information.

13. The apparatus of claim 12 wherein the at least one processor is further configured to receive resource bandwidth information, wherein the first frequency location is associated with a first resource bandwidth within the active bandwidth part, and the second frequency location is associated with a second resource bandwidth within the active bandwidth part.

14. The apparatus of claim 13 wherein the first resource bandwidth is associated with a first priority value and the second resource bandwidth is associated with a second priority value.

15. The apparatus of claim 14 wherein the at least one processor is further configured to prioritize transmit power based on the first priority value and the second priority value.

16. The apparatus of claim 12 wherein the first frequency location is associated with a first bandwidth part and the second frequency location is associated with a second bandwidth part.

17. The apparatus of claim 12 wherein the first sounding reference signal and the second sounding reference signal have the same usage.

18. The apparatus of claim 12 wherein a transmit power for the first sounding reference signal and a transmit power for the second sounding reference signal are equally decreased to meet a transmit power budget for a user equipment.

19. The apparatus of claim 12 wherein the at least one processor is further configured to:
   determine a capability of a user equipment; and
   transmit the first sounding reference signal and the second sounding reference signal based at least in part on the capability of the user equipment.

20. The apparatus of claim 19 wherein the first sounding reference signal and the second sounding reference signal are a same type of sounding reference signal, and the user equipment is configured to frequency division multiplex the first sounding reference signal and the second sounding reference signal.

21. The apparatus of claim 19 wherein the first sounding reference signal and the second sounding reference signal are different types of sounding reference signal with a same time-domain behavior, and the user equipment is configured to frequency division multiplex the first sounding reference signal and the second sounding reference signal.

22. The apparatus of claim 19 wherein the user equipment is configured to transmit the first sounding reference signal and the second sounding reference signal one at a time.

23. An apparatus for facilitating a measurement of a propagation channel in a wireless network, comprising:
- means for receiving first sounding reference signal configuration information associated with a first frequency location in a component carrier;
- means for receiving second sounding reference signal configuration information associated with a second frequency location in the component carrier, being the same component carrier that includes the first frequency location, wherein the second frequency location is disjoint from the first frequency location in the component carrier; and
- means for transmitting, simultaneously, a first sounding reference signal and a second sounding reference signal within an active bandwidth part and based on the respective first sounding reference signal configuration information and the second sounding reference signal configuration information.

24. An apparatus for facilitating a measurement of a propagation channel in a wireless network, comprising:
- a memory;
- at least one transceiver;
- at least one processor communicatively coupled to the memory and the at least one transceiver and configured to:
  - provide a user equipment with a first sounding reference signal information associated with a first frequency location in a component carrier and a second sounding reference signal information associated with a second frequency location in the component carrier, being the same component carrier that includes the first frequency location, wherein the second frequency location is disjoint from the first frequency location in the component carrier; and
  - receive, simultaneously from the user equipment, a first sounding reference signal and a second sounding reference signal within an active bandwidth part and based on the respective first sounding reference signal configuration information and the second sounding reference signal configuration information.

25. The apparatus of claim 24 wherein the first frequency location is associated with a first bandwidth part and the second frequency location is associated with a second bandwidth part.

* * * * *